United States Patent
Umebayashi et al.

(10) Patent No.: US 7,645,036 B2
(45) Date of Patent: Jan. 12, 2010

(54) INK-JET RECORDING INK SET AND INK-JET RECORDING METHOD

(75) Inventors: Tsutomu Umebayashi, Kanagawa (JP); Toshiyuki Makuta, Kanagawa (JP); Yutaka Maeno, Kanagawa (JP); Masaaki Konno, Kanagawa (JP); Tetsuzo Kadomatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 504 days.

(21) Appl. No.: 11/712,967

(22) Filed: Mar. 2, 2007

(65) Prior Publication Data

US 2007/0206045 A1 Sep. 6, 2007

(30) Foreign Application Priority Data

Mar. 2, 2006 (JP) ............... 2006-056954

(51) Int. Cl.
C09D 11/00 (2006.01)
(52) U.S. Cl. .................... 347/100; 106/31.13
(58) Field of Classification Search .......... 347/100; 106/31.13
See application file for complete search history.

(56) References Cited

U.S. PATENT DOCUMENTS

| | | | | |
|---|---|---|---|---|
| 6,007,182 A * | 12/1999 | Matsubara et al. | ............ | 347/43 |
| 2005/0065235 A1 | 3/2005 | Bauer | | |
| 2006/0023044 A1 | 2/2006 | Bauer | | |
| 2006/0203056 A1* | 9/2006 | Furukawa et al. | ............ | 347/96 |
| 2007/0216743 A1* | 9/2007 | Makuta et al. | ............ | 347/100 |

FOREIGN PATENT DOCUMENTS

| EP | 1 149 881 A2 | 10/2001 |
|---|---|---|
| EP | 1 426 193 A1 | 6/2004 |
| EP | 1 671 804 A2 | 6/2006 |
| EP | 1 671 805 A2 | 6/2006 |
| JP | 63-60783 A | 3/1988 |
| JP | 8-174997 A | 7/1996 |
| JP | 10-323975 A | 12/1998 |
| JP | 2003-145745 A | 5/2003 |
| JP | 2004-42525 A | 2/2004 |
| JP | 2004-42548 A | 2/2004 |
| JP | 2005-96254 A | 4/2005 |
| JP | 2005-154767 A | 6/2005 |
| JP | 2006-137183 A | 6/2006 |
| JP | 2006-137185 A | 6/2006 |
| WO | 02/085638 A1 | 10/2002 |
| WO | 2004/087824 A2 | 10/2004 |
| WO | 2006/104278 A1 | 10/2006 |

* cited by examiner

Primary Examiner—Manish S Shah
Assistant Examiner—Laura E Martin
(74) Attorney, Agent, or Firm—Sughrue Mion, PLLC

(57) ABSTRACT

An ink-jet recording ink set, containing at least one recording liquid containing a colorant and a polymerizable compound and an ink spread suppressing liquid containing at least one surfactant and substantially no colorant, wherein all of the following conditions (A), (B) and (C) are satisfied, and an ink-jet recording method using the same:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0)-\gamma^s(\text{saturated}) > 1$ mN/m; and (C) the surface tension of the ink spread suppressing liquid satisfies the following relationship:

$\gamma^s < (\gamma^s(0)+\gamma^s(\text{saturated})^{max})/2$.

18 Claims, 2 Drawing Sheets

INK-JET RECORDING INK SET AND INK-JET RECORDING METHOD

CROSS-REFERENCE TO RELATED APPLICATION

This application claims priority under 35USC 119 from Japanese Patent Application No.2006-56954, the disclosure of which is incorporated by reference herein. All publication, patent applications, and technical standards mentioned in this specification are herein incorporated by reference to the same extent as if each individual publication, patent application, or technical standard was specifically and individually indicated to be incorporated by reference.

BACKGROUND OF THE INVENTION

1. Field of the Invention

The present invention relates to an ink-jet recording ink set and an image forming method, and in particular, to a multi-liquid ink-jet recording ink set superior in fixing efficiency on various recording media including impermeable media and image reproducibility and an ink-jet recording method using the same.

2. Description of the Related Art

Ink-jet processes of ejecting ink from an ink-ejecting unit such as nozzle have been used in many printers, because they demand smaller space and are cheaper and allow non-contact image formation of recording media. Among many ink-jet processes, a piezo ink-jet process of ejecting ink by using deformation of a piezoelectric device and a thermal ink-jet process of ejecting ink by using the boiling phenomenon of ink under application of heat energy are characteristically superior in image definition and printing speed.

Currently, there is an urgent need for improvement in the processing speed and the image quality when an image is formed on an impermeable recording medium such as plain paper or plastic film in an ink-jet printer. Especially when a impermeable recording medium is used, elongation of drying of droplets after printing often leads to image bleeding and interference between ink droplets by mixing between neighboring ink droplets, making it difficult to form a sharp image (the interference between ink droplets is a phenomenon of neighboring ejected droplets fusing with each other for decrease in surface energy (for decrease in surface area). Fusion of neighboring droplets causes migration of the droplets, i.e., deviation of the droplets from the ejected positions, and thus, especially with an ink containing a colorant, fluctuation in line width when a thin line is drawn and irregularity of an image when the image is painted.).

Another problem known when an image is formed on an impermeable recording medium is that the fixing efficiency of the ink on recording medium is lower and the abrasion and water resistances are also lower.

As a method of accelerating hardening and fixing of ink on a recording medium for inhibition of image bleeding and improvement of fixing efficiency on the recording medium, a radiation-hardening ink-jet ink that is hardened not by evaporation of ink solvent but by irradiation with radiation ray was proposed in JP-A No. 10-323975.

However, even in such a case, it was not possible to prevent ejection interference occurring before radiation hardening.

Alternatively, proposed was an image forming method of printing an image by applying substantially water-free active light-hardening inks at least in four colors or more from ink-jet recording heads on a recording material, wherein an active light-hardening ink containing no colorant or a colorant in an amount of 1% or less is applied on a recording material at first and then, active light-hardening inks containing a colorant are applied (JP-A No. 2005-96254). Printing by the disclosed method occasionally resulted in spread of the droplets of the ink containing a colorant ejected on the ink containing no colorant and deterioration in the image sharpness.

Yet alternatively, an ink set consisting of a recording liquid containing a colorant and an ink spread suppressing liquid containing a component reactive with the component in the recording liquid was proposed in JP-A No. 2005-154767. Even with the ink set, it was difficult to form a high-definition image without ejection interference superior in fixing efficiency on an impermeable recording medium.

As described above, it was not possible to improve the fixing efficiency on impermeable recording media and prevent deterioration in image quality, for example by ejection interference, at the same time by conventional methods.

SUMMARY OF THE INVENTION

The present invention has been made in view of the above circumstances and provides an ink-jet recording ink set and an ink-jet recording method.

A first aspect of the invention provides an ink-jet recording ink set, comprising at least one recording liquid containing a colorant and a polymerizable compound and a ink spread suppressing liquid containing at least one surfactant and substantially no colorant, wherein all of the following conditions (A), (B) and (C) are satisfied:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0) - \gamma^s(\text{saturated}) > 1$ mN/m; and (C) the surface tension of the ink spread suppressing liquid satisfies the following relationship:

$\gamma^s < (\gamma^s(0) + \gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

A second aspect of the invention provides an ink-jet recording method using an ink-jet recording ink set comprising at least one recording liquid containing a colorant and a polymerizable compound and an ink spread suppressing liquid containing at least one surfactant and substantially no colorant, the method comprising forming an image on a recording medium by applying the recording liquid and the ink spread suppressing liquid; and hardening the formed image by applying energy thereto, wherein all of the following conditions (A), (B) and (C) are satisfied:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0)-\gamma^s(\text{saturated}) > 1$ mN/m; and (C) the surface tension of the ink spread suppressing liquid satisfies the following relationship:

$\gamma^s < (\gamma^s(0)+\gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

DETAILED DESCRIPTION OF THE INVENTION

Figure 1:
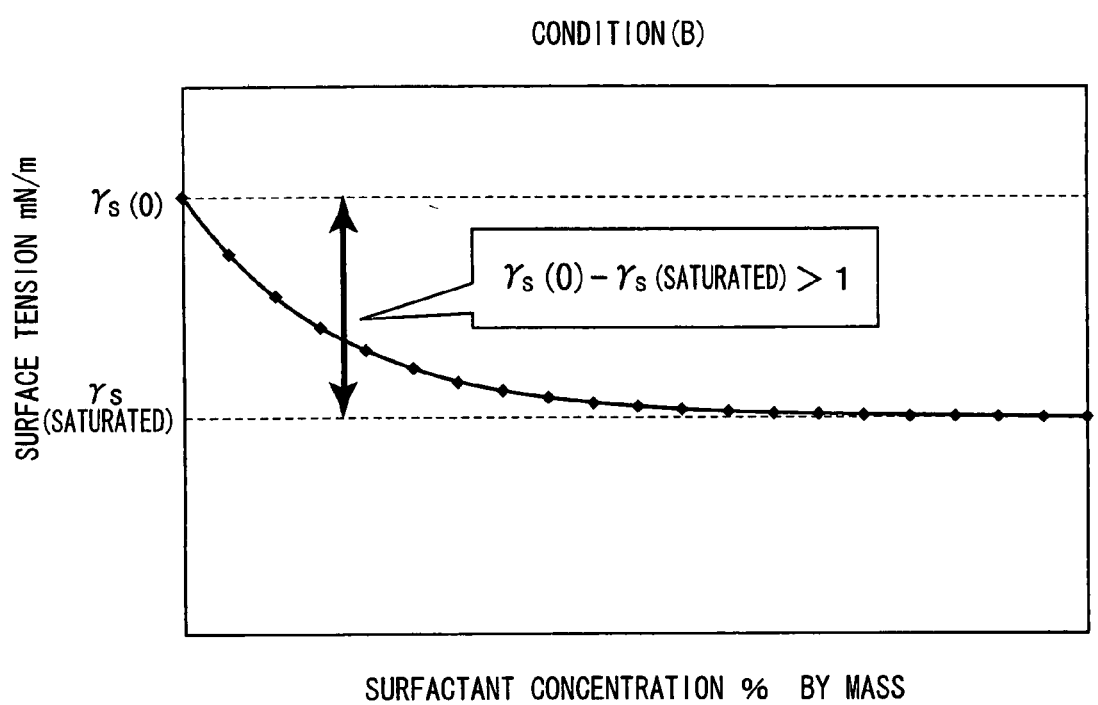
FIG. 1 is a schematic diagram showing the condition (B) in the relationship between the surfactant concentration and the surface tension of a liquid obtained by eliminating all surfactants from the ink spread suppressing liquid.

The ink-jet recording ink set according to the present invention is an ink-jet recording ink set, comprising at least one recording liquid containing a colorant and a polymerizable compound (hereinafter, referred to as "recording liquid") and an ink spread suppressing liquid containing at least one surfactant and substantially no colorant, wherein all of the following conditions (A), (B) and (C) are satisfied:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0)-\gamma^s(\text{saturated}) > 1$ mN/m; and (C) the surface tension of the ink spread suppressing liquid satisfies the following relationship:

$\gamma^s < (\gamma^s(0)+\gamma^s(\text{saturated})^{max})/2$.

In the Formulae above, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

The inventors have found a method of avoiding interference between ejected (applied) ink droplets, by using a two-liquid ink system of a recording liquid containing at least a polymerizable compound and a colorant and a liquid containing substantially no colorant to solve the problems described in the description of the related art.

However, in the method, droplets of the recording liquid applied on the recording liquid often spread thereon and become undesirably larger in dot diameter in a short period of several milliseconds after ejection. Accordingly, there exists an urgent need for a method of obtaining a desirable dot diameter without expansion in dot diameter.

Under the circumstance above, after intensive studies, the inventors have found that it was possible to avoid the interference between ejected ink droplets and obtain a dot with a desirable size, by using a multi-liquid ink system consisting of a recording liquid containing a colorant and a polymerizable compound and a ink spread suppressing liquid containing a surfactant and substantially no colorant and controlling the surface tensions of both liquids to desired values as the means for suppressing spread of the recording liquid, and completed the invention.

Studies by the inventors indicated that an ink set in combination of a recording liquid and a ink spread suppressing liquid satisfying the relationship of condition (A), which makes the surface area of the dot of the ink spread suppressing liquid having a smaller surface tension (low surface energy) larger and that of the dot of the recording liquid having a greater surface tension (high surface energy) smaller to minimize the entire surface energy, reduces spread of the recording liquid dot.

However, it is difficult to suppress spread of the recording liquid dot sufficiently even if the condition (A) is satisfied, and thus, the conditions (B) and (C) should also be satisfied. Under the condition satisfying both relationships, the surfactant forms an adsorption layer at the gas-liquid interface of the ink spread suppressing liquid, and the adsorption layer seems to have a function to suppress spread of the recording liquid dot.

Thus, the invention is based on the finding that it is necessary to satisfy the following three conditions: (1) to apply the droplets of the recording liquid on the droplets of the ink spread suppressing liquid so that the droplets overlaps each other on the recording medium, (2) to make the surface tension of the ink spread suppressing liquid smaller than that of the recording liquid, and (3) to add a particular surfactant to the ink spread suppressing liquid, for obtaining a high-definition image by the prevention of interference between the applied recording liquid droplets and widening of the recording liquid dot.

In the configuration of the invention above, it is possible to provide a recorded image superior in the fixing efficiency of the ink on recording medium without turbulence in the image by interference between ink droplets or by spread of the ink droplets, when an image is formed by using the ink set.

(Condition (A))

In the invention, as described above, the surface tension of the ink spread suppressing liquid $\gamma^s$ should be smaller than the surface tension $\gamma^k$ of at least one recording liquid contained in the ink-jet recording ink set, for forming an ink dot in a desirable size on a recording medium.

For more effective prevention of the spread of ink droplet during the period from ejection (application of the ink droplet) to exposure, more preferably, $\gamma^s<\gamma^k-3$ (mN/m), and still more preferably, $\gamma^s<\gamma^k-5$ (mN/m).

In printing a full color image, the surface tension of the ink spread suppressing liquid $\gamma^s$ is preferably at least lower than that of the recording liquid containing a colorant higher in visual sensitivity, more preferably lower than the surface tension of any recording liquids contained in the ink-jet recording ink set, for improvement of the image sharpness. The colorant higher in visual sensitivity is, for example, a magenta, black, or cyan colorant.

Even when the surface tension of the recording liquid $\gamma^k$ and the surface tension of the ink spread suppressing liquid $\gamma^s$ satisfy the relationship above, if the both values are less than 15 mN/m, it may become difficult to form droplets during ink-jet ejection, leading to ejection failure. On the other hand, the values of more than 50 mN/m may lead to deterioration in wettability with the ink-jet head, causing a problem of ejection failure. Accordingly, for more favorable ejection, the surface tension of the recording liquid $\gamma^k$ and the surface tension of the ink spread suppressing liquid $\gamma^s$ are preferably both 15 mN/m or more and 50 mN/m or less, more preferably 18 mN/m or more and 40 mN/m or less, and particularly preferably 20 mN/m or more and 38 mN/m or less.

The surface tension is a value determined according to Wilhelmy method at a liquid temperature of 20° C. and 60% RH by using a commonly used surface tension balance (for example, surface tension balance CBVP-Z, manufactured by Kyowa Interface Science Co., Ltd.).

(Conditions (B) and (C))

In the invention, the ink spread suppressing liquid contains at least a surfactant, for forming an ink dot in a desirable size on a recording medium. The relationship between the surfactant concentration and the surface tension when one of the surfactants contained in the ink spread suppressing liquid is added to a liquid obtained by eliminating all surfactants from the ink spread suppressing liquid will be described below, with reference to FIGS. 1 and 2.

FIG. 1 is a schematic diagram showing the condition (B) in the relationship between the surfactant concentration and the surface tension of a liquid obtained by eliminating all surfactants from the ink spread suppressing liquid. Alternatively, FIG. 2 is a schematic diagram showing the condition (C) in the relationship between the surfactant concentration and the surface tension of a liquid obtained by eliminating all surfactants from the ink spread suppressing liquid.

As shown in FIG. 1, at least one of the surfactants contained in the ink spread suppressing liquid of the ink-jet recording ink set according to the invention should satisfy the following condition (B):

$\gamma^s(0)-\gamma^s(\text{saturated})>1$ mN/m    condition (B).

Figure 2:
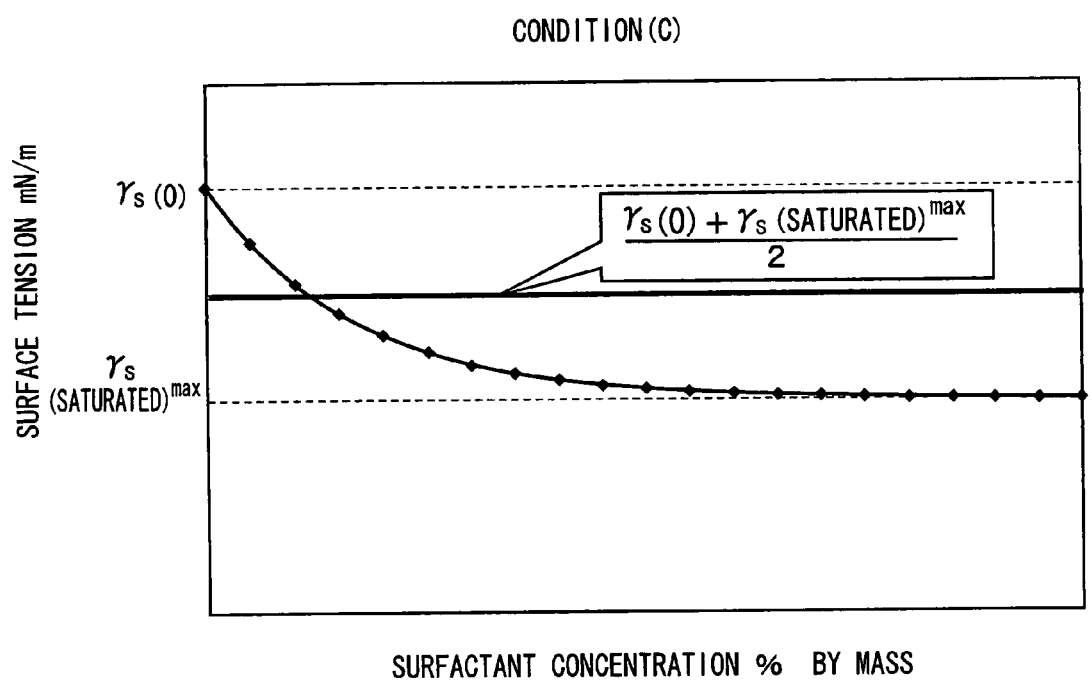
FIG. 2 is a schematic diagram showing the condition (C) in the relationship between the surfactant concentration and the surface tension of a liquid obtained by eliminating all surfactants from the ink spread suppressing liquid.

In addition, as shown in FIG. 2, the surface tension of the ink spread suppressing liquid with an added surfactant should satisfy the relationship of the following condition (C):

$\gamma^s<(\gamma^s(0)+\gamma^s(\text{saturated})^{max})/2$    condition (C).

In the Formula, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

The $\gamma^s(0)$ value is determined by measuring the surface tension of the liquid obtained by eliminating all surfactants from the ink spread suppressing liquid. The $\gamma^s(\text{saturated})$ value is determined by measuring the surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid and the concentration of the surfactant is increased stepwise at an interval of 0.01% by mass until the change in surface tension becomes 0.01 mN/m or less.

Hereinafter, $\gamma^s(0)$, $\gamma^s(\text{saturated})$, and $\gamma^s(\text{saturated})^{max}$ will be described specifically.

For example, when the components for the ink spread suppressing liquid (Example 1) are a high-boiling point organic solvent (diethyl phthalate, manufactured by Wako Pure Chemical Industries, Ltd.), a polymerization initiator (TPO-L, exemplary compound, initiator 1), a fluorochemical surfactant (Megaface F475, manufactured by Dainippon Ink and Chemicals Inc.), and a hydrocarbon based surfactant (sodium di-2-ethylhexylsulfoscuccinate), $\gamma^s(0)$, $\gamma^s(\text{saturated})^1$ (when a fluorochemical surfactant is added), $\gamma^s(\text{saturated})^2$ (when a hydrocarbon based surfactant is added), $\gamma^s(\text{saturated})$, and, $\gamma^s(\text{saturated})^{max}$ are respectively as follows:

$\gamma^s(0)$, the surface tension of the liquid obtained by eliminating all surfactants from the ink spread suppressing liquid, was 36.7 mN/m. $\gamma^s(\text{saturated})^1$, the saturated surface tension of the liquid obtained by eliminating all surfactants from the ink spread suppressing liquid when a fluorochemical surfactant is added thereto until the surface tension thereof becomes saturated, was 20.2 mN/m. $\gamma^s(\text{saturated})^2$, the saturated surface tension of the liquid obtained by eliminating all surfactants from the ink spread suppressing liquid when a hydrocarbon based surfactant is added thereto until the surface tension thereof becomes saturated, was 30.5 mN/m.

The ink spread suppressing liquid (Example 1) contains two surfactants satisfying the condition (B), and thus, has two $\gamma^s(\text{saturated})$ values: $\gamma^s(\text{saturated})^1$, when a fluorochemical surfactant is added and $\gamma^s(\text{saturated})^2$ when a hydrocarbon based surfactant is added. Accordingly, $\gamma^s(\text{saturated})^{max}$, the maximum value between $\gamma^s(\text{saturated})^1$ and $\gamma^s(\text{saturated})^2$ above, is $\gamma^s(\text{saturated})^2$.

In summary, $\gamma^s(0)=36.7$ mN/m, $\gamma^s(\text{saturated})^1=20.2$ mN/m (when a fluorochemical surfactant is added), $\gamma^s(\text{saturated})^2=30.5$ mN/m (when a hydrocarbon-based surfactant is added), and $\gamma^s(\text{saturated})^{max}=30.5$ mN/m.

Accordingly, the surface tension of the ink spread suppressing liquid $\gamma^s$ should satisfy the following relationship:

$\gamma^s<(\gamma^s(0)+\gamma^s(\text{saturated})^{max})/2=33.6$ mN/m.

As for the condition (C), for more effective prevention of spread of the ink droplet during the period from ejection to exposure, the surface tension of the ink spread suppressing liquid more preferably satisfies the following relationship:

$\gamma^s<\gamma^s(0)-3\times\{\gamma^s(0)-\gamma^s(\text{saturated})\}/4$, and particularly preferably the following relationship:

$$\gamma^s \leqq \gamma^s(\text{saturated}).$$

The surface tension is a value determined according to Wilhelmy method at a liquid temperature of 20° C. and 60% RH by using a commonly used surface tension balance (for example, surface tension balance CBVP-Z, manufactured by Kyowa Interface Science Co., Ltd.).

Hereinafter, the recording liquid and the ink spread suppressing liquid for used in the ink-jet recording ink set described above and the components therein will be described in more detail.

—Recording Liquid—

The recording liquid contains at least a colorant and a polymerizable compound and is liquid at room temperature. From the viewpoint of ink-jet ejection efficiency, the viscosity thereof is preferably 100 mPa·s or less at 25° C., or 30 mPa·s or less at 60° C.; the viscosity is more preferably 60 mPa·s or less at 25° C., or 20 mPa·s or less at 60° C.; and the viscosity is particularly preferably 40 mPa·s or less at 25° C., or 15 mPa·s or less at 60° C. The recording liquid is preferably nonaqueous, because water and aqueous solvents demand a longer period for fixing.

—Ink Spread Suppressing Liquid—

The ink spread suppressing liquid contains a surfactant and substantially no colorant and is liquid at room temperature. From the viewpoint of ink-jet ejection efficiency, the viscosity is preferably 100 mPa·s or less at 25° C., or 30 mPa·s or less at 60° C.; the viscosity is more preferably 60 mPa·s or less at 25° C., or 20 mPa·s or less at 60° C.; and the viscosity is particularly preferably 40 mPa·s or less at 25° C., or 15 mPa·s or less at 60° C.

The phrase "contain substantially no colorant" does not exclude presence of a transparent colorless dye or pigment, or a colorant in an extremely small invisible amount. The allowance is preferably 1% by mass or less with respect to the entire weight of the ink spread suppressing liquid, and particularly preferably, the ink spread suppressing liquid contains no colorant at all.

In addition, the ink spread suppressing liquid preferably contains a high-boiling point organic solvent for reduction in the amount of volatile organic compounds (VOC) emitted.

The difference in viscosity (at 25° C.) between the recording liquid and the ink spread suppressing liquid is preferably 25 mPa·s or less.

(Polymerizable Compound)

The recording liquid according to the invention contains a polymerizable compound, for example, for improvement in fixing efficiency and prevention of image bleeding.

Any one of known polymerizable or crosslinkable materials reacting in radical polymerization reaction, cationic polymerization reaction, or dimerization reaction may be used as the polymerizable compound. Typical examples of thereof include addition polymerization compounds having at least one ethylenic unsaturated double bond, epoxy compounds, oxetane compounds, oxirane compounds, polymers having a maleimide group on the side chain, polymers having a photodimerizable unsaturated double bond, such as cinnamyl, cinnamylidene, or chalcone group, close to an aromatic ring on the side chain, and the like. It is preferably a radical polymerization compound, for improvement in fixing efficiency and prevention of image bleeding.

The addition polymerization compound having at least one ethylenic unsaturated double bond is selected from compounds having at least one, preferably two or more, terminal ethylenic unsaturated bond (monofunctional or multifunctional compounds).

Specifically, it may be selected from the compounds widely known in the art, and examples thereof include compounds in various chemical structures, for example in the form of monomer, prepolymer (such as dimer, trimer or oligomer, or the mixture thereof), and the copolymer thereof.

Specifically, preferable examples of the polymerizable compound include compounds having a polymerizable group such as an acryloyl group, a methacryloyl group, an allyl group, a vinyl group, and an internal double bond group (e.g., maleic acid) within the molecule, and among them, compounds having acryloyl groups or methacryloyl groups are preferable from the viewpoint of causing curing reaction at low energy.

Examples of the above-described multifunctional compound include vinyl group containing aromatic compounds, (meth)acrylates which are esters of a bivalent or higher valent alcohol and (meth)acrylic acid, (meth)acrylamides which are amides of a bivalent or higher valent amine and (meth)acrylic acid, polyester(meth)acrylate in which (meth)acrylic acid is introduced into an ester obtained by combining a polybasic acid with a bivalent alcohol or polycaprolactone, polyether (meth)acrylate in which (meth)acrylic acid is introduced into an ether obtained by combining an alkylene oxide with a polyvalent alcohol, epoxy(meth)acrylate obtained by introducing (meth)acrylic acid into an epoxy resin, or by reacting a bivalent or higher valent alcohol with a epoxy-containing monomer, urethane acrylates having urethane bonds, amino resin acrylates, acrylic resin acrylates, alkyd resin acrylates, spirane resin acrylates, silicone resin acrylates, reaction products of an unsaturated polyester and a photopolymerizable monomer, and reaction products of a wax and the above-described polymerizable monomer.

Among them, (meth)acrylate, polyester(meth)acrylate, polyether(meth)acrylate, epoxy acrylate, urethane acrylate, acrylic resin acrylate, silicone resin acrylate, and reaction products of an unsaturated polyester and the photopolymerizable monomer are preferable. Acrylate, polyester acrylate, polyether acrylate, epoxy acrylate, and urethane acrylate are particularly preferable.

In the present description, (meth)acrylic acid refers to both acrylic acid and methacrylic acid.

Specific examples of the above-described multifunctional compound include divinylbenzene, 1,3-butanediol diacrylate, 1,6-hexanediol diacrylate, pentaerythritol triacrylate, trimethylolpropane triacrylate, dipentaerythritol hexaacrylate, 1,6-acryloyl aminohexane, hydroxy pivalic acid ester neopentyl glycol diacrylate, polyester acrylate having (meth) acryloyl groups at the ends of the molecular chain of polyester compound which is produced by a dibasic acid and a divalent alcohol and has a molecular weight of 500 to 30000, polyethyleneglycol diacrylate, epoxy acrylates having a bisphenol (A, S, or F) skeleton and a molecular weight of 450 to 30000, epoxy acrylates containing a phenol novolak resin skeleton and having a molecular weight of 600 to 30000, reactants of a polyvalent isocyanate and a (meth)acrylic acid monomer having hydroxy groups, and having a molecular weight of 350 to 30000, and urethane modified products having urethane bonds within the molecule.

Examples of the monofunctional compound include (meth)acrylate, styrene, acrylamide, vinyl group-containing monomers (e.g., vinyl esters, vinyl ethers, and N-vinyl amides), and (meth)acrylic acid. Among them, (meth)acrylate, acrylamide, vinyl esters, and vinyl ethers are preferable, and (meth)acrylate and acrylamide are particularly preferable.

The polymerizable compound may be nonsubstituted or substituted. Examples of the possible substituent include a halogen atom, a hydroxy group, an amide group, and a carboxylic acid group.

Specific examples of the above-described monofunctional compound include hydroxyethyl acrylate, glycidyl acrylate, tetrahydrofurfuryl acrylate, dicyclopentenyl acrylate, 2-acryloyloxyethyl phosphate, allyl acrylate, N,N-dimethylaminoethyl acrylate, N,N-dimethyl acrylamide, N,N-diethyl aminopropyl acrylamide, N-butoxymethyl acrylamide, acryloyl morpholine, 2-hydroxyethylvinyl ether, N-vinyl formamide, N-vinyl acetamide, 2-cyclohexyl carbamoyloxyethyl acrylate, acrylates having a polybutyl acrylate moiety in an ester, and acrylates having a polydimethyl siloxane moiety in an ester.

Examples of cation polymerizable monomers usable in the present invention include the epoxy compounds, vinyl ether compounds, and oxetane compounds described in JP-A No. 6-9714, JP-A No. 2001-31892, JP-A No. 2001-40068, JP-A No. 2001-55507, JP-A No. 2001-310938, JP-A No. 2001-310937 and JP-A No. 2001-220526.

Examples of the epoxy compounds include aromatic epoxides and alicyclic epoxides.

Examples of monofunctional epoxy compounds usable in the invention include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexene oxide, 3-methacryloyloxymethylcyclohexene oxide, 3-acryloyloxymethylcyclohexene oxide, and 3-vinylcyclohexene oxide.

Examples of multifunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexyl methyl-3',4'-epoxycyclohexane carboxylate, 2-(3,4-epoxycyclohexyl-5,5-spiro-3,4-epoxy)cyclohexane-metha-dioxane, bis(3,4-epoxycyclohexylmethyl)adipate, vinylcyclohexene oxide, 4-vinylepoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylene bis(3, 4-epoxycyclohexane), dicyclopentadiene diepoxide, ethyleneglycol di(3,4-epoxycyclohexylmethyl)ether, ethylenebis(3,4-epoxycyclohexane carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxy octane, and 1,2, 5,6-diepoxy cyclooctane.

Among these epoxy compounds, aromatic epoxides and alicyclic epoxides are preferable since they are advantageous in respect of the curing rate. Alicyclic epoxides are particularly preferable.

Examples of monofunctional vinyl ethers usable in the invention include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexylmethyl vinyl ether, benzyl vinyl ether, dicyclopentenyl vinyl ether, 2-dicyclopentenoxy ethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxy polyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxy polyethylene glycol vinyl ether.

Examples of multifunctional vinyl ethers include: divinyl ethers such as ethylene glycol divinyl ether, diethylene glycol divinyl ether, polyethylene glycol divinyl ether, propylene glycol divinyl ether, butylene glycol divinyl ether, hexane diol divinyl ether, bisphenol A alkylene oxide divinyl ether, and bisphenol F alkylene oxide divinyl ether; and multifunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, and propylene oxide-added dipentaerythritol hexavinyl ether.

From the viewpoint of curing properties, adhesion to a recording medium, and the surface hardness of an image formed, the vinyl ether compound is preferably a di-or trivinyl ether compound, particularly preferably a divinyl ether compound.

The oxetane compound usable in the invention refers to a compound having an oxetane ring. Such an oxetane compound may be selected arbitrarily from known oxetane compounds such as described in JP-A No. 2001-220526, JP-A No. 2001-310937, and JP-A No. 2003-341217. The compound having an oxetane ring usable in the ink composition of the invention is preferably a compound having 1 to 4 oxetane rings in its structure. By using such a compound, the viscosity of the ink composition can be maintained in a range which enables easy handling, and the ink after curing adheres strongly to the recording medium.

Examples of monofunctional oxetanes usable in the invention include 3-ethyl-3-hydroxymethyl oxetane, 3-(meth)allyloxymethyl-3-ethyl oxetane, (3-ethyl-3-oxetanylmethoxy)methyl benzene, 4-fluoro-[1-(3-ethyl-3-oxetanylmethoxy)methyl]benzene, 4-methoxy-[1-(3-ethyl-3-oxetanylmethoxy)methyl]benzene, [1-(3-ethyl-3-oxetanylmethoxy)ethyl]phenyl ether, isobutoxymethyl(3-ethyl-3-oxetanylmethyl)ether, isobornyloxyethyl(3-ethyl-3-oxetanylmethyl)ether, isobornyl(3-ethyl-3-oxetanylmethyl) ether, 2-ethylhexyl(3-ethyl-3-oxetanylmethyl)ether, ethyldiethylene glycol(3-ethyl-3-oxetanylmethyl)ether, dicyclopentadiene(3-ethyl-3-oxetanylmethyl)ether, dicyclopentenyloxyethyl(3-ethyl-3-oxetanylmethyl)ether, dicyclopentenyl(3-ethyl-3-oxetanylmethyl)ether, tetrahydrofurfuryl (3-ethyl-3-oxetanylmethyl)ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl)ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3- oxetanylmethyl)ether, pentabromophenyl(3-ethyl-3-oxetanylmethyl)ether, and bornyl(3-ethyl-3-oxetanylmethyl)ether.

Examples of multifunctional oxetanes include 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1,3-bis[(3-ethyl-3-oxetanylmethoxy)methyl]propane, ethylene glycol bis(3-ethyl-3-oxetanylmethyl)ether, dicyclopentenyl bis(3-ethyl-3-oxetanylmethyl)ether, triethylene glycol bis(3-ethyl-3-oxetanylmethyl)ether, tetraethylene glycol bis(3-ethyl-3-oxetanylmethyl)ether, tricyclodecanediyldimethylene(3-ethyl-3-oxetanylmethyl)ether, trimethylolpropane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl)ether, PO-modified hydrogenated bisphenol A bis(3-ethyl-3-oxetanylmethyl)ether, and EO-modified bisphenol F (3-ethyl-3-oxetanylmethyl)ether.

Such compounds having oxetane rings are described in detail in columns "0021" to "0084" of JP-A 2003-341217 supra, and the compounds described therein can be preferably used in the present invention as well. Among the oxetane compounds usable in the present invention, a compound having one or two oxetane rings is preferable from the viewpoint of the viscosity and adhesiveness of the ink composition.

When an oxetane compound is used in the invention, it is preferably used in combination with at least one compound selected form epoxy compounds and vinylether compounds.

The polymerizable compounds may be used alone or in combination of two or more. However, the polymerizable compound is preferably insoluble in water, because presence of water or an aqueous solvent demands an extended period for fixing.

The content thereof in the recording liquid (each droplet) is preferably in the range of 50 to 98% by mass, more preferably 40 to 95% by mass, and particularly preferably 50 to 90% by mass, with respect to the entire weight of the recording liquid (each droplet) for improvement in fixing efficiency and prevention of ink bleeding. Favorably, it is possible to improve fixing efficiency and prevent ink bleeding on recording medium in the range above.

The content of the polymerizable compound in the recording liquid (each droplet) is preferably in the range of 50 to 99.6% by mass, more preferably 70 to 99.0% by mass, and still more preferably 80 to 99.0% by mass, with respect to the total solid (weight) of the recording liquid (each droplet), for improvement in fixing efficiency and prevention of ink bleeding. Favorably, it is possible to improve the fixing efficiency and prevent ink bleeding on the recording medium in the range above.

(Surfactant)

The ink spread suppressing liquid according to the invention contains at least one surfactant, as described above, for forming an ink dot in a desirable size on a recording medium.

The surfactant according to the invention is a substance having a strong surface activity to at least one solvent selected from hexane, cyclohexane, p-xylene, toluene, ethyl acetate, methyl ethyl ketone, butyl carbitol, cyclohexanone, triethylene glycol monobutylether, 1,2-hexanediol, propylene glycol monomethylether, isopropanol, methanol, water, isobornyl acrylate, 1,6-hexanediol diacrylate, and polyethylene glycol diacrylate; preferably, a substance having a strong surface activity to at least one solvent selected from hexane, toluene, propylene glycol monomethylether, isobornyl acrylate, 1,6-hexanediol diacrylate, and polyethylene glycol diacrylate; more preferably, a substance having a strong surface activity to at least one solvent selected from propylene glycol monomethylether, isobornyl acrylate, 1,6-hexanediol diacrylate, and polyethylene glycol diacrylate; and particularly preferably, a substance having a strong surface activity to at least one solvent selected from isobornyl acrylate, 1,6-hexanediol diacrylate, and polyethylene glycol diacrylate.

It is possible to determine whether a compound is the substance having a strong surface activity to the solvents listed above according to the following procedure.

(Procedure)

A solvent is selected from the solvents listed above, and the surface tension of the solvent $\gamma(0)$(solvent) is determined. The compound is added to the solvent of which the $\gamma(0)$(solvent) is determined; the concentration of the compound is increased stepwise at an concentration interval of 0.01% by mass until the change in surface tension become not larger than 0.01 mN/m; and then the surface tension of the solution $\gamma$(saturated)(solvent) is determined. If the relationship between the $\gamma(0)$(solvent) and the $\gamma$(saturated)(solvent) satisfies the following formula, the compound is judged to be a substance having a strong surface activity to the solvent.

$$\gamma(0)(\text{solvent}) - \gamma(\text{saturated})(\text{solvent}) > 1 \text{ mN/m},$$

Typical examples of the surfactants contained in the ink spread suppressing liquid include anionic surfactants such as dialkyl sulfosuccinate salts, alkylnaphthalenesulfonate salts, and fatty acid salts; nonionic surfactants such as polyoxyethylene alkylethers, polyoxyethylene alkylallylethers, acetylene glycols, and polyoxyethylene-polyoxypropylene block copolymers; cationic surfactants such as alkylamine salts and quaternary ammonium salts; fluorochemical surfactants; and the like. Examples of the other surfactants include those described in JP-A Nos. 62-173463, and 62-183457.

Among the surfactants above, the surfactant for use in the ink spread suppressing liquid is particularly preferably a fluorochemical surfactant, for more effective reduction of the surface tension of the solution. The fluorochemical surfactants include linear or cyclic compounds having at least one, preferably three or more, fluorine atoms and at least one, preferably three or more, carbon atoms in the molecule and polymers having fluorine and carbon atoms on the main or side chain. Any of cationic, nonionic, anionic, and betaine surfactants may be used favorably.

Typical examples of the fluorochemical surfactants for use in the invention include those described in U.S. Pat. Nos. 3,589,906, 3,666,478, 3,754,924, 3,775,126, and 3,850,640; German Patent Nos. 1,942,665, 1,961,638, and 2,124,262, British Patent-A No. 1,330,356; Belgian Patent No. 742,680; JP-A Nos. 46-7781, 48-9715, 49-46733, 49-133023, 50-99529, 50-113221, 50-160034, 51-43131, 51-129229, 51-106419, 53-84712, 54-111330, 56-109336, 59-30536, and 59-45441; JP-B Nos. 47-9303, 48-43130, and 59-5887; and others. Typical examples of the fluorochemical surfactants for use in the invention are shown below.

F-1
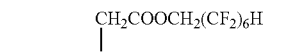

F-2
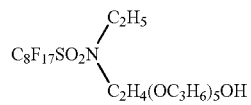

F-3
$CF_3(CF_2)_6COONH_4$

F-4
$CF_3(CF_2)_9(CH_2)_{10}COOH$

F-5
$CF_3(CF_2)_5(CH_2)_{10}COONa$

F-6
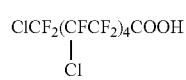

F-7
$H(CF_2CF_2)_5COONa$

F-8
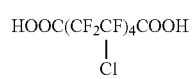

F-9
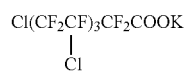

F-10
$CF_3(CF_2)_6CHCH(CH_2)_3COONa$

F-11
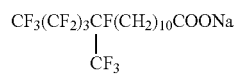

F-12
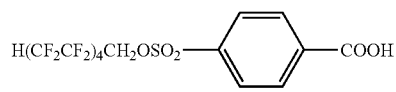

F-13
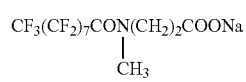

F-14
$Cl(CF_2CF_2)_3COONa$

F-15
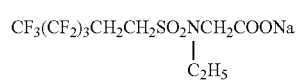

F-16
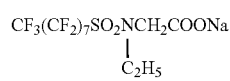

F-17
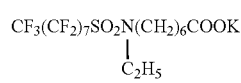

F-18
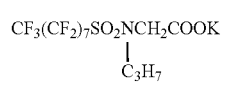

F-19
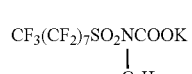

F-20
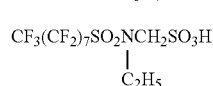

F-21
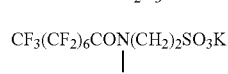

F-22
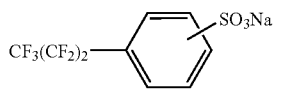
($SO_3K$ at the o-, m-, or p-position)

F-23
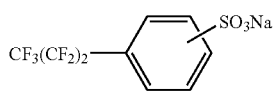
(ditto)

F-24
$CF_3(CF_2)_7SO_3K$

F-25
$CF_3(CF_2)_{11}CH_2OSO_3Na$

F-26
$CF_3(CF_2)_6COO(CH_2)_3SO_3Na$

F-27
$H(CF_2)_6CH_2O(CH_2)_3SO_3Na$

F-28
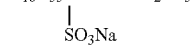

F-29

F-30

F-31
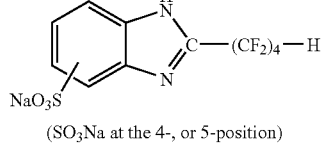
($SO_3Na$ at the 4-, or 5-position)

F-32
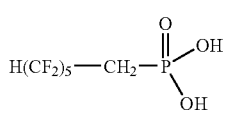

F-33
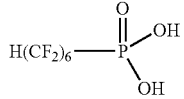

F-34
$CF_3(CF_2)_{12}COO(CH_2CH_2O)_{20}H$

F-35
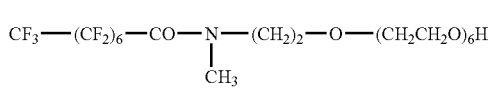

F-36
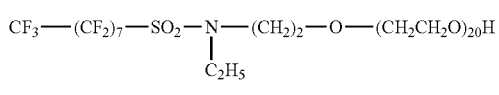

F-37
$CF_3(CF_2)_6COO(CH_2CH_2O)_8CH_3$

F-38
$H(CF_2CF_2)_6CH_2OH$

F-39
$H(CF_2CF_2)_3CH_2OH$

F-40
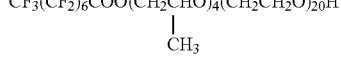

F-41
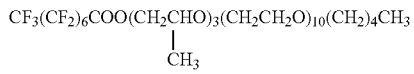

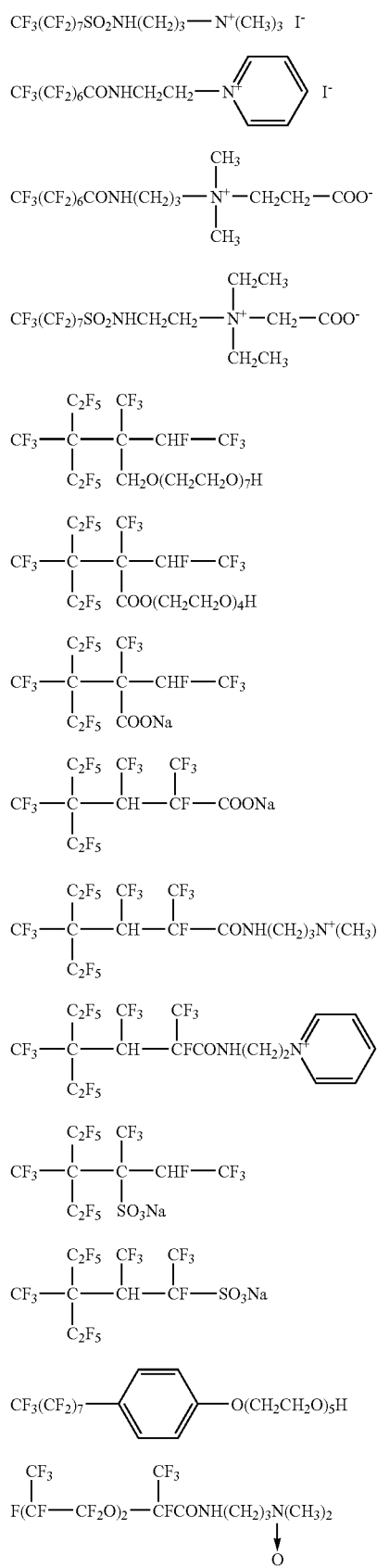
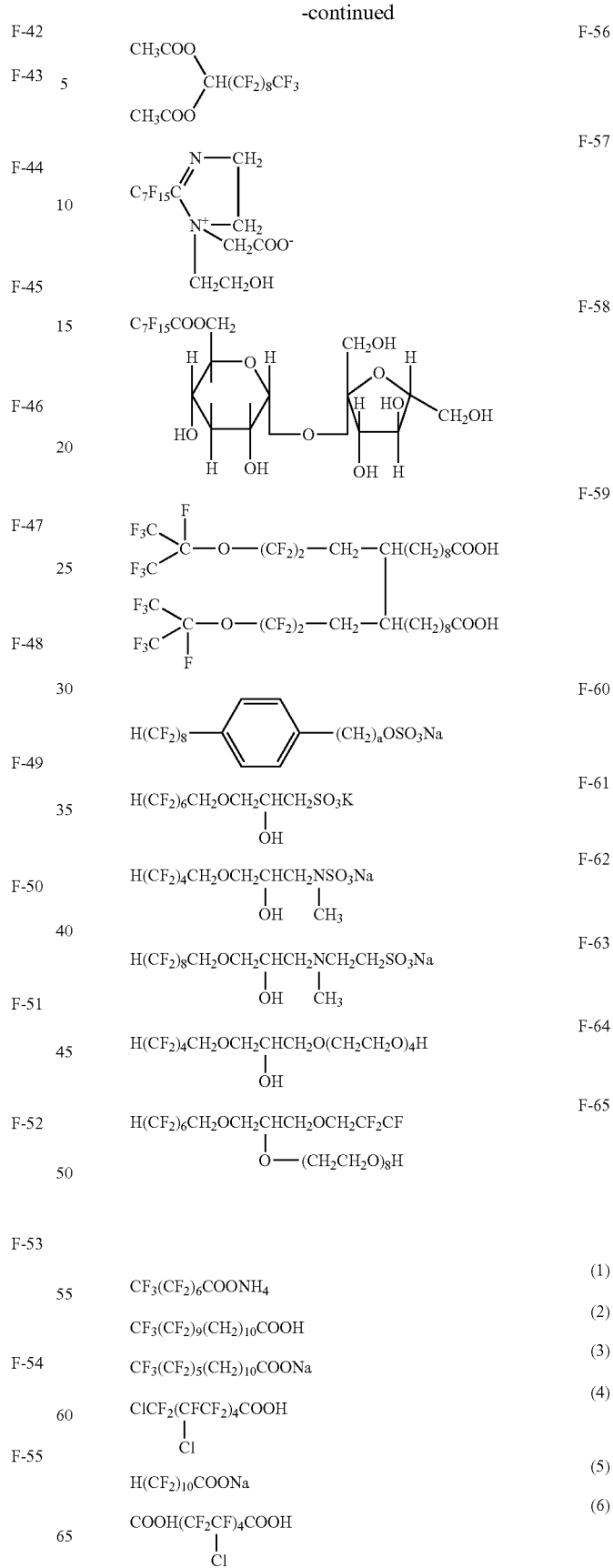

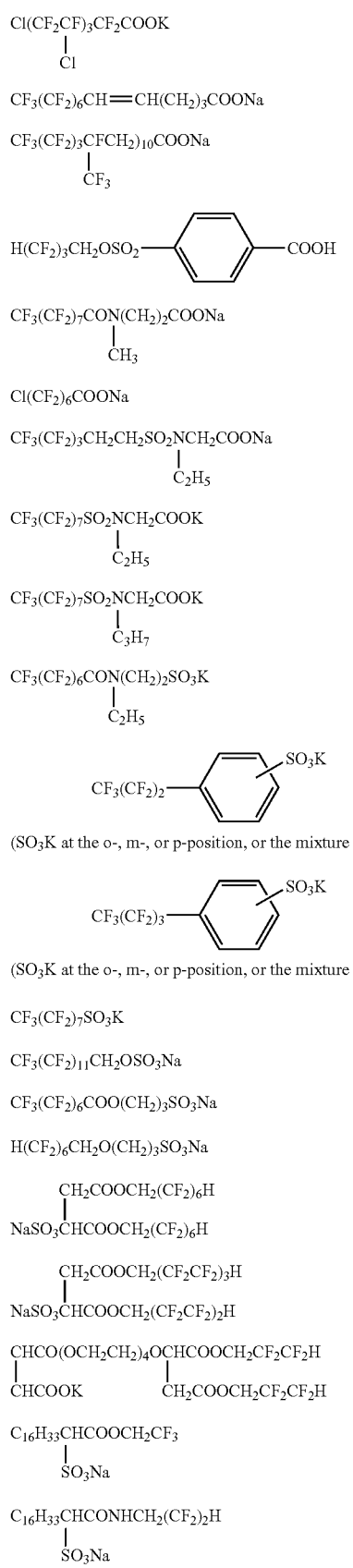
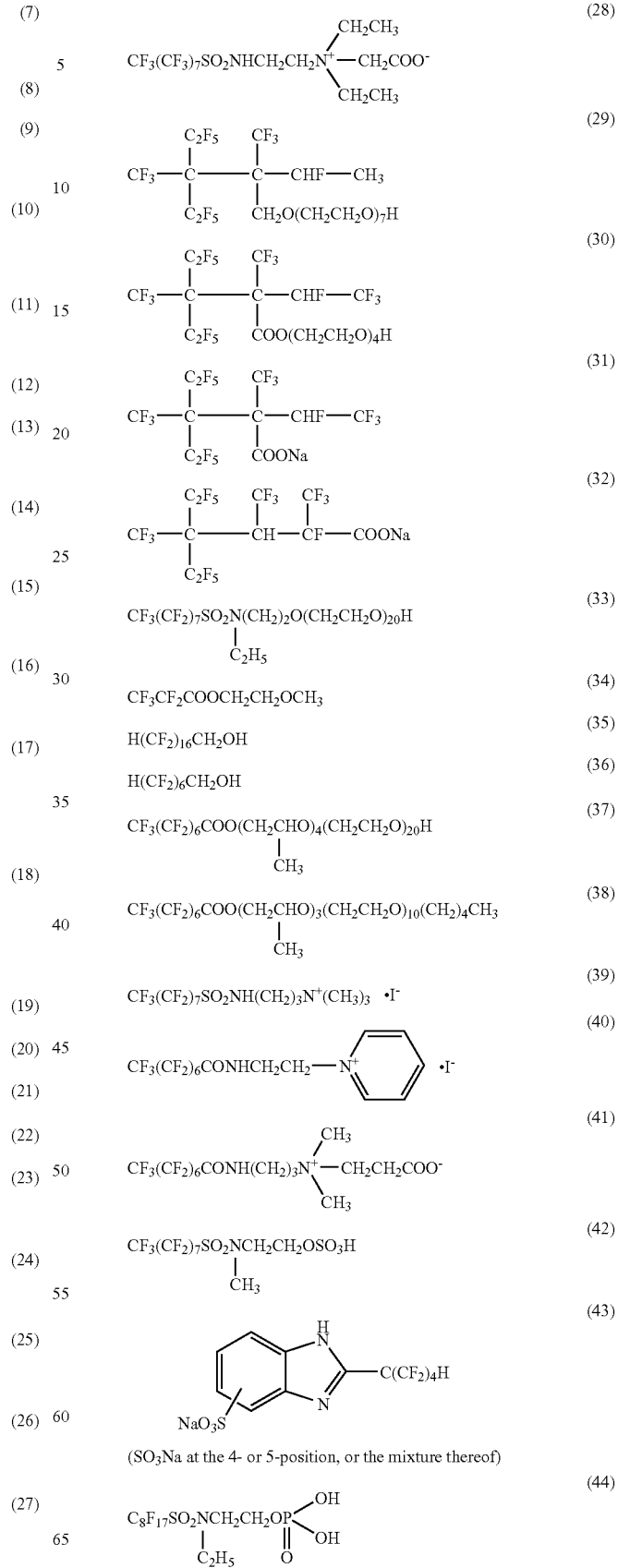

-continued

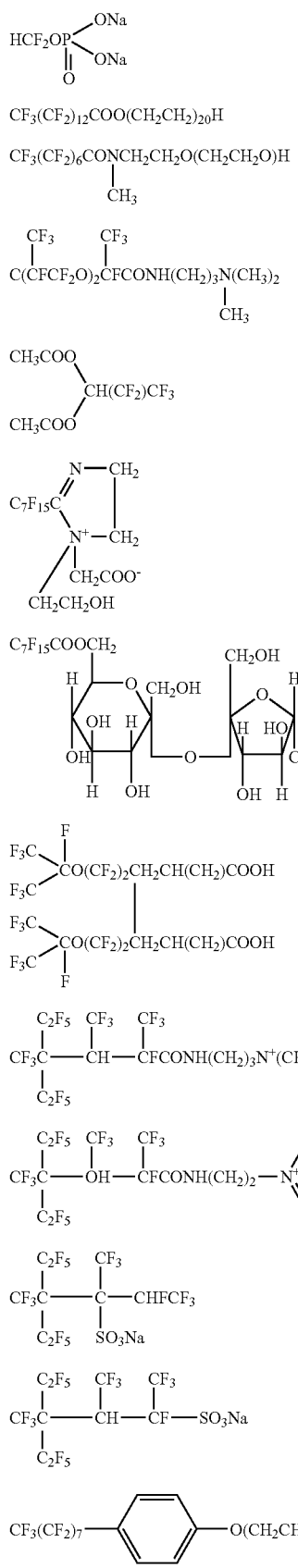

(45) H(CF$_2$)$_6$CH$_2$O(CH$_2$CH$_2$O)$_{10}$H (58)

(46) H(CF$_2$)$_6$CH$_2$O(CH$_2$CH$_2$O)$_{20}$H (59)

(47) H(CF$_2$)$_4$CH$_2$O(CH$_2$CH$_2$O)$_5$H (60)

(48) H(CF$_2$)$_6$CH$_2$O(CH$_2$CHCH$_2$O)$_5$H (61)
                                      |
                                      OH

(49) H(CF$_2$)$_6$CH$_2$O(CH$_2$CHCH$_2$O)$_2$(CH$_2$CH$_2$O)$_5$H (62)
                                                |
                                                OH

The fluorochemical surfactant for use in the invention can be prepared according to the methods described, for example, in U.S. Pat. Nos. 2,559,751, 2,567,011, 2,732,398, 2,764,602, 2,806,866, 2,809,998, 2,915,376, 2,915,528, 2,934,450, 2,937,098, 2,957,031, 3,472,894, and 3,555,089; JP-B No. 45-37304; JP-A No. 47-9613: J. Chem. Soc., 1950, p. 2789 and ibid, 1957, p. 2574 and 2640; J. Amer. Chem. Soc., 79, p. 2594 (1957); J. Japan Oil Chemist's Soc., 12, p. 653; and others.

The fluorochemical surfactant according to the invention is not particularly limited to the compounds above, and any one of commercially available products may be used. Examples thereof include perfluoroalkylethyleneoxide adducts, perfluoroalkyl-containing oligomers, and others; and typical examples thereof include "Megaface F-443", "Megaface F-444", "Megaface F-445", "Megaface F-446", "Megaface F-470", "Megaface F-471", "Megaface F-474", "Megaface F-475", "Megaface F-477", "Megaface F-479", "Megaface F-482", "Megaface F-483", "Megaface F-484", "Megaface F-486", "Megaface F-172D", and "Megaface F-178K", (manufactured by Dainippon Ink and Chemicals, Inc.) and others. Other examples include those described in "13,700 Chemical Products" p. 1239 to 1242, The Chemical Daily Co., Ltd. (2000).

On the other hand, a surfactant may also be added to the recording liquid. However, when the recording liquid and the ink spread suppressing liquid contain the same surfactant, the concentration Mk, in the recording liquid, of the surfactant is preferably smaller than the concentration Ms, in the ink spread suppressing liquid, of the surfactant, for prevention of spread of the ink droplet during the period from ejection to exposure. Thus, the concentration Ms, in the ink spread suppressing liquid, of at least one surfactant among the surfactants contained in the ink spread suppressing liquid is larger than the concentration Mk, in the recording liquid, of said surfactant. For more effective prevention of spread of the ink droplet during ejection to exposure, the relationship between Mk and Ms is preferably, Mk<Ms/2, particularly preferably, Mk<Ms/5.

(Colorant)

The recording liquid according to the invention contains at least a colorant. On the other hand, the ink spread suppressing liquid contains substantially no colorant.

The colorant for use is not particularly limited, and may be selected properly from known various pigments and dyes according to applications. The colorant contained in the recording liquid is preferably a pigment, from the viewpoint of light stability.

The pigments that are preferably used in the invention will be explained.

As the pigment, organic pigments and inorganic pigments that are usually available on the market and also, pigments obtained by dyeing resin particles with dyes may be used without any particular limitation. In addition, commercially available pigment dispersants and surface treated pigments, for example, those obtained by dispersing pigments in an insoluble resin as a dispersion medium or those obtained by grafting a resin on the surface of a pigment may be used insofar as they do not impair the effect of the invention.

Examples of these pigments include the pigments described, for example, in Seijiro Itoh, "Dictionary of Pigments" (2000), W. Herbst and K. Hunger, "Industrial Organic Pigments", and JP-A Nos. 2002-12607, 2002-188025, 2003-26978, and 2003-342503, the disclosures of which are incorporated herein by reference.

Specific examples of the organic and inorganic pigments for use in the invention include the following. Examples of pigments of yellow color include: monoazo pigments such as C.I. Pigment Yellow 1 (Fast Yellow G, etc.) and C.I. Pigment Yellow 74; disazo pigments such as C.I. Pigment Yellow 12 (Disazo Yellow AAA, etc.) and C.I. Pigment Yellow 17; non-benzidine azo pigments such as C.I. Pigment Yellow 180; azolake pigments such as C.I. Pigment Yellow 100 (tartrazine yellow lake, etc.); condensation azo pigments such as C.I. Pigment Yellow 95 (Condensation Azo Yellow GR, etc.); acidic-dye lake pigments such as C.I. Pigment Yellow 115 (quinoline yellow lake, etc.); basic-dye lake pigments such as C.I. Pigment Yellow 18 (thioflavin lake, etc.); anthraquinone pigments such as flavanthrone yellow (Y-24); isoindolinone pigments such as isoindolinone yellow 3RLT (Y-110); quinophtharone pigments such as quinophtharone yellow (Y-138); isoindoline pigments such as isoindoline yellow (Y-139); nitroso pigments such as C.I. Pigment Yellow 153 (nickel nitroso yellow, etc.); and metal-complex-salt azomethine pigments such as C.I. Pigment Yellow 117 (copper azomethine yellow, etc.).

Examples of red or magenta pigments include: monoazo pigments such as C.I. Pigment Red 3 (toluidine red, etc.); disazo pigments such as C.I. Pigment Red 38 (Pyrazolone Red B, etc.); azolake pigments such as C.I. Pigment Red 53:1 (Lake Red C, etc.) and C.I. Pigment Red 57:1 (Brilliant Carmine 6B); condensation azo pigments such as C.I. Pigment Red 144 (Condensation Azo Red BR, etc.); acidic dye lake pigments such as C.I. Pigment Red 174 (Phloxine B Lake, etc.); basic dye lake pigments such as C.I. Pigment Red 81 (Rhodamine 6G' Lake, etc.); anthraquinone pigments such as C.I. Pigment Red 177 (dianthraquinolyl red, etc.); thioindigo pigments such as C.I. Pigment Red 88 (Thioindigo Bordeaux, etc.); perynone pigments such as C.I. Pigment Red 194 (perynone red, etc.); perylene pigments such as C.I. Pigment Red 149 (perylene scarlet, etc.); quinacridone pigments such as C.I. Pigment Violet 19 (unsubstituted quinacridone) and C.I. Pigment Red 122 (quinacridone magenta, etc.); isoindolinone pigments such as C.I. Pigment Red 180 (Isoindolinone Red 2BLT, etc.); and alizarin lake pigments such as C.I. Pigment Red 83 (madder lake, etc.).

Examples of blue or cyan pigments include disazo pigments such as C.I. Pigment Blue 25 (dianisidine blue, etc.); phthalocyanine pigments such as C.I. pigment blue 15 (phthalocyanine blue, etc.); acidic dye lake pigments such as C.I. pigment blue 24 (peacock blue lake, etc.); basic dye lake pigments such as C.I. Pigment Blue 1 (Victoria Pure Blue BO Lake, etc.); anthraquinone pigments such as C.I. pigment blue 60 (indanthron blue, etc.); and alkali blue pigments such as C.I. Pigment Blue 18 (alkali blue V-5:1).

Examples of green pigments include phthalocyanine pigments such as C.I. Pigment Green 7 (phthalocyanine green) and C.I. Pigment Green 36 (phthalocyanine green); and azo metal complex pigments such as C.I. Pigment Green 8 (nitroso green).

Examples of orange pigments include isoindoline pigments such as C.I. Pigment Orange 66 (isoindoline orange); and anthraquinone pigments such as C.I. Pigment Orange 51 (dichloropyranthron orange).

Examples of black pigments include carbon black, titanium black, and aniline black.

As specific examples of white pigments, basic lead carbonate ($2PbCO_3Pb(OH)_2$, so-called silver white), zinc oxide (ZnO, so-called zinc white), titanium oxide ($TiO_2$, so-called titanium white), and strontium titanate ($SrTiO_3$, so-called titanium strontium white) can be used.

Since titanium oxide has a lower specific gravity and a higher refractive index than other white pigments and is more stable chemically or physically, titanium oxide has a greater masking and coloring potential as a pigment, and is further excellent in resistance to acid or alkali and other environmental factors. Thus, the use of titanium oxide as a white pigment is preferable. Of course, other white pigment (including white pigments other than those described above) may be used as necessary.

For dispersing the colorant, dispersing machines such as a ball mill, a sand mill, an attriter, a roll mill, a jet mill, a homogenizer, a paint shaker, a kneader, an agitator, a Henschel mixer, a colloid mill, an ultrasonic wave homogenizer, a pearl mill, and a wet jet mill, may be used.

When the colorant is dispersed, a dispersant such as a surfactant can be added.

A synergist suitable for various colorants may be used as a dispersing aid as necessary. The amount of dispersing aid is preferably 1 to 50 parts by mass per 100 parts by mass of the colorant.

In the recording liquid, a solvent may be used as the dispersion medium for various components such as colorant, or the polymerizable compound, which is a low-molecular-weight component, may be used as a solvent-free dispersion medium. The recording liquid is preferably an activated energy radiation-curable liquid. The recording liquid is preferably free of solvent because the recording liquid is cured after applied onto a recording medium. If the solvent remains in the image formed from the cured recording liquid, solvent resistance may be deteriorated and a problem of VOC (Volatile Organic Compound) may occur. Thus, the dispersion medium is preferably a polymerizable compound, particularly preferably a polymerizable compound having the lowest viscosity, in view of the improvement in the dispersibility and handling property of the ink composition.

A colorant having a smaller diameter is more excellent in coloring properties. Therefore, the average particle diameter of the pigment to be used is preferably in the range of about 0.01 to 0.4 μm, more preferably in the range of 0.02 to 0.2 μm. The maximum particle diameter may be 3 μm or less, preferably 1 μm or less; such a maximum particle diameter can be achieved by appropriate selections of the colorant, the dispersant, the dispersing medium, the dispersion conditions, and the filtration conditions. By controlling the particle diameter, clogging in a head nozzle can be prevented, and the storage stability of the recording liquid, the transparency of the recording liquid, and the curing sensitivity can be secured. Because the dispersant excellent in dispersibility and stability is used in the invention, a uniform and stable dispersion can be obtained even when fine colorant particles having a very small particle diameter is used.

The particle diameter of the colorant in the recording liquid can be measured by a known measurement method. Specifically, the particle diameter can be measured by a centrifugal-sedimentation light-transmission method, an X-ray transmission method, a laser diffraction/scattering method, or a dynamic light scattering method.

In the invention, the values obtained by measurement using a laser diffraction/scattering method are adopted.

The addition amount of the colorant in the recording liquid is preferably 1 to 50% by mass or less, more preferably 1 to 30% by mass, and most preferably 2 to 20% by mass.

(Polymerization Initiator)

At least one of the recording solution and ink spread suppressing liquid of the invention preferably contains a polymerization initiator for radical polymerization or a cation polymerization and particularly preferably contains a photopolymerization initiator. From the view point of liquid storage stability of the recording liquid and the ink spread suppressing liquid, the polymerization initiator is preferably contained in the ink spread suppressing liquid to separate from the polymerizable compound.

The polymerization initiator in the invention is a compound that is changed chemically through the action of light or an interaction with a sensitizing dye put in an electron excited state to produce at least one of a radical, an acid and a base. Particularly, the polymerization initiator used in the invention is preferably the photo-radical initiator or a photo-acid generator from the viewpoint of initiating polymerization by such a simple means as exposure.

The photopolymerization initiator may be selected appropriately from initiators having sensitivity to the activated ray for irradiation, such as UV ray at 400 to 200 nm, far UV ray, g-line, h-line, i-line, KrF excimer laser light, ArF excimer laser light, electron ray, X-ray, molecular beam, or ion beam.

Specifically, any of common photopolymerization initiators known in the art may be used. Specific examples thereof are described, for example, in Bruce M. Monroe et al., Chemical Revue, 93, 435 (1993); R, S. Davidson, Journal of Photochemistry and biology, A: Chemistry, 73, 81 (1993); J. P. Faussier, "Photoinitiated Polymerization-Theory and Applications": Rapra Review vol. 9, Report, Rapra Technology (1998); and M. Tsunooka et al., Prog. Polym. Sci., 21, 1 (1996), the disclosures of which are incorporated herein by reference. Many compounds favorably used in chemical-amplification photoresists and for photocationic polymerization are also described in Japanese Research Association for Organic Electronics Materials Ed., "Organic Materials for Imaging" (published by Bun-Shin Shuppan (1993), pp. 187 to 192), the disclosure of which is incorporated herein by reference. The compounds that undergo oxidative or reductive bond cleavage through the interaction with the electronically-excited state of sensitizing dye are also known, and described, for example in F. D. Saeva, Topics in Current Chemistry, 156, 59 (1990); G. G. Maslak, Topics in Current Chemistry, 168, 1 (1993); H. B. Shuster et al., JACS, 112, 6329 (1990); I. D. F. Eaton et al., JACS, 102, 3298 (1980), the disclosures of which are incorporated herein by reference.

Preferable examples of such photopolymerization initiators include (a) aromatic ketones, (b) aromatic onium salt compounds, (c) organic peroxides, (d) hexaarylbiimidazole compounds, (e) ketoxime ester compounds, (f) borate compounds, (g) azinium compounds, (h) metallocene compounds, (i) active ester compounds, and (j) compounds containing a carbon-halogen bond.

Preferable examples of the aromatic ketones (a) include the compounds each having a benzophenone or thioxanthone skeleton described, for example in "Radiation Curing in Polymer Science and Technology" J. P. Fouassier and J. F. Rabek (1993), pp. 77 to 117, the disclosure of which is incorporated herein by reference. More preferable examples of the aromatic ketones (a) include the α-thio benzophenone compounds described in Japanese Patent Application Publication (JP-B) No. 47-6416 (the disclosure of which is incorporated herein by reference); the benzoin ether compounds described in JP-B No. 47-3981 (the disclosure of which is incorporated herein by reference); the α-substituted benzoin compounds described in JP-B No. 47-22326 (the disclosure of which is incorporated herein by reference); the benzoin derivatives described in JP-B No. 47-23664 (the disclosure of which is incorporated herein by reference); the aroyl phosphonic acid esters described in Japanese Patent Application Laid-Open (JP-A) No. 57-30704 (the disclosure of which is incorporated herein by reference); the dialkoxybenzophenones described in JP-B No. 60-26483 (the disclosure of which is incorporated herein by reference); the benzoin ethers described in JP-B No. 60-26403 and JP-A No. 62-81345 (the disclosures of which are incorporated herein by reference); the α-amino benzophenones described in JP-B No. 1-34242, U.S. Pat. No. 4,318,791, and EP Patent No. 0284561A1 (the disclosures of which are incorporated herein by reference); p-di(dimethylaminobenzoyl)benzene described in JP-A No. 2-211452 (the disclosure of which is incorporated herein by reference); the thio-substituted aromatic ketones described in JP-A No. 61-194062 (the disclosure of which is incorporated herein by reference); the acylphosphine sulfides described in JP-B No. 2-9597 (the disclosure of which is incorporated herein by reference); the acylphosphines described in JP-B No. 2-9596 (the disclosure of which is incorporated herein by reference); the thioxanthones described in JP-B No. 63-61950 (the disclosure of which is incorporated herein by reference); and the coumarins described in JP-B No. 59-42864 (the disclosure of which is incorporated herein by reference).

Examples of the aromatic onium salt compounds (b) include aromatic onium salts of the elements in Groups V, VI and VII in the periodic table, specifically, aromatic onium salts of N, P, As, Sb, Bi, O, S, Se, Te, and I. Preferable examples thereof include the iodonium salts described in EP Patent No. 104143, U.S. Pat. No. 4,837,124, and JP-A Nos. 2-150848 and 2-96514 (the disclosures of which are incorporated herein by reference); the sulfonium salts described in EP Patent Nos. 370693, 233567, 297443, 297442, 279210, and 422570 and U.S. Pat. Nos. 3,902,144, 4,933,377, 4,760, 013, 4,734,444, and 2,833,827 (the disclosures of which are incorporated herein by reference); diazonium salts (e.g., benzene diazonium salts which may have one or more substituted groups); diazonium salt resins (e.g., formaldehyde resins of diazodiphenylamine); N-alkoxypyridinium salts (e.g., those described in U.S. Pat. No. 4,743,528, JP-A Nos. 63-138345, 63-142345, and 63-142346, and JP-B No. 46-42363 (the disclosures of which are incorporated herein by reference), and specifically, 1-methoxy-4-phenylpyridinium tetrafluoroborate, etc.); and the compounds described in JP-B Nos. 52-147277, 52-14278, and 52-14279 (the disclosures of which are incorporated herein by reference). The aromatic onium salt compound (b) generates a radical or an acid as an active species.

Examples of the organic peroxides (c) include almost all organic compounds having one or more oxygen-oxygen bonds in the molecule; and preferable examples thereof include peroxide esters such as 3,3',4,4'-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl) benzophenone, 3,3',4,4'-tetra-(t-octylperoxycarbonyl) benzophenone, 3,3',4,4'-tetra-(cumylperoxycarbonyl)

benzophenone, 3,3',4,4'-tetra-(p-isopropyl cumylperoxycarbonyl)benzophenone, and di-t-butyl diperoxyisophthalate.

Examples of the hexaarylbiimidazole compounds (d) include the Rofin dimers described in JP-B Nos. 45-37377 and 44-86516, such as 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o-, p-dichlorophenyl)-4,4',55'-tetraphenylbiimidazole, 2,2'-bis(o-chlorophenyl)-4,4',5,5'-tetra(m-methoxyphenyl)biimidazole, 2,2'-bis(o-, o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

Examples of the ketoxime ester compounds (e) include 3-benzoyloxyiminobutan-2-one, 3-acetoxyiminobutan-2-one, 3-propionyloxyiminobutan-2-one, 2-acetoxyiminopentane-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compounds (f) as examples of other photopolymerizable initiator of the invention include the compounds described in U.S. Pat. Nos. 3,567,453 and 4,343,891, and EP Patent No. 109,772 and 109,773 (the disclosures of which are incorporated herein by reference).

Examples of the azinium compounds (g) as examples of other photopolymerizable initiator of the invention include the compounds containing an N—O bond described in JP-A Nos. 63-138345, 63-142345, 63-142346, and 63-143537, and JP-B No. 46-42363, the disclosures of which are incorporated herein by reference.

Examples of the metallocene compounds (h) as examples of other photopolymerizable initiator of the invention include the titanocene compounds described in JP-A Nos. 59-152396, 61-151197, 63-41484, 2-249, and 2-4705 (the disclosures of which are incorporated herein by reference) and the iron-allene complexes described in JP-A Nos. 1-304453 and 1-152109 (the disclosures of which are incorporated herein by reference).

Specific examples of the titanocene compounds include di-cyclopentadienyl-Ti-dichloride, dicyclopentadienyl-Ti-bisphenyl, di-cyclopentadienyl-Ti-bis-2,3,4,5,6-pentafluorophen-1-yl, di-cyclopentadienyl-Ti-bis-2,3,5,6-tetrafluorophen-1-yl, di-cyclopentadienyl-Ti-bis-2,4,6-trifluorophen-1-yl, di-cyclopentadienyl-Ti-2,6-difluorophen-1-yl, di-cyclopentadienyl-Ti-bis-2,4-difluorophen-1-yl, di-methylcyclopentadienyl-Ti-bis-2,3,4,5,6-pentafluorophen-1-yl, di-methylcyclopentadienyl-Ti-bis-2,3,5,6-tetrafluorophen-1-yl, di-methylcyclopentadienyl-Ti-bis-2,4-difluorophen-1-yl, bis(cyclopentadienyl)-bis(2,6-difluoro-3-(pyr-1-yl)phenyl)titanium, bis(cyclopentadienyl) bis[2,6-difluoro-3-(methyl sulfonamide)phenyl]titanium, and bis (cyclopentadienyl) bis[2,6-difluoro-3-(n-butylbiaroyl-amino)phenyl)titanium.

Examples of the active ester compounds (i) include the nitrobenzylester compounds described in EP Patent Nos. 0290750, 046083, 156153, 271851, and 0388343, U.S. Pat. Nos. 3,901,710 and 4,181,531, and JP-A Nos. 60-198538 and 53-133022 (the disclosures of which are incorporated herein by reference); the iminosulfonate compounds described in EP Patent Nos. 0199672, 84515, 199672, 044115, and 0101122, U.S. Pat. Nos. 4,618,564, 4,371,605 and 4,431,774, and JP-A Nos. 64-18143, 2-245756, and 4-365048 (the disclosures of which are incorporated herein by reference); and the compounds described in JP-B Nos. 62-6223 and 63-14340, and JP-A No. 59-174831 (the disclosure of which is incorporated herein by reference).

Preferable examples of the compounds (j) containing carbon-halogen bonds include the compounds described in Wakabayashi et al., Bull. Chem. Soc, Japan, 42, 2924 (1969) (the disclosure of which is incorporated herein by reference); the compounds described in British Patent No. 1388492 (the disclosure of which is incorporated herein by reference); the compounds described in JP-A No. 53-133428 (the disclosure of which is incorporated herein by reference); and the compounds described in German Patent No. 3337024 (the disclosure of which is incorporated herein by reference).

Further examples include the compounds described in F. C. Schaefer et al., J. Org. Chem. 29, 1527 (1964) (the disclosure of which is incorporated herein by reference); the compounds described in JP-A No. 62-58241 (the disclosure of which is incorporated herein by reference); the compounds described in JP-A No. 5-281728 (the disclosure of which is incorporated herein by reference); as well as the compounds described in German Patent No. 2641100 (the disclosure of which is incorporated herein by reference); the compounds described in German Patent No. 3333450 (the disclosure of which is incorporated herein by reference); the compounds described in German Patent No. 3021590 (the disclosure of which is incorporated herein by reference); and the compounds described in German Patent No. 3021599 (the disclosure of which is incorporated herein by reference).

Preferable specific examples of the compounds represented by (a) to (j) are shown below:

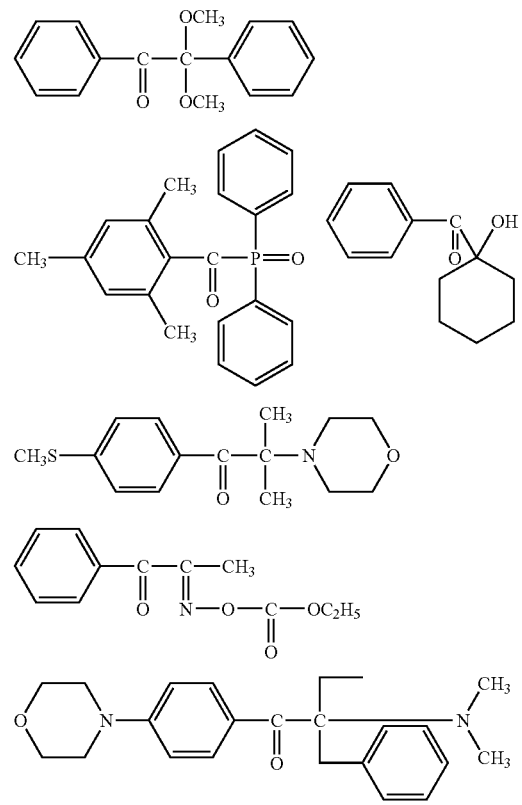

-continued
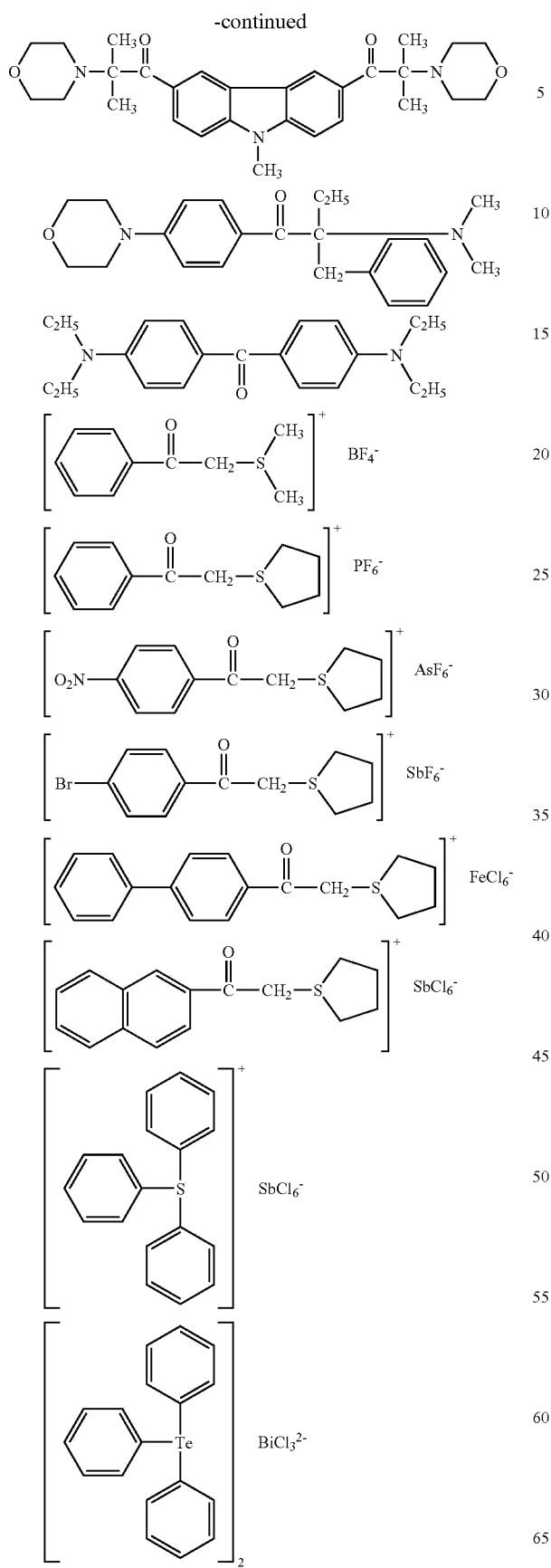
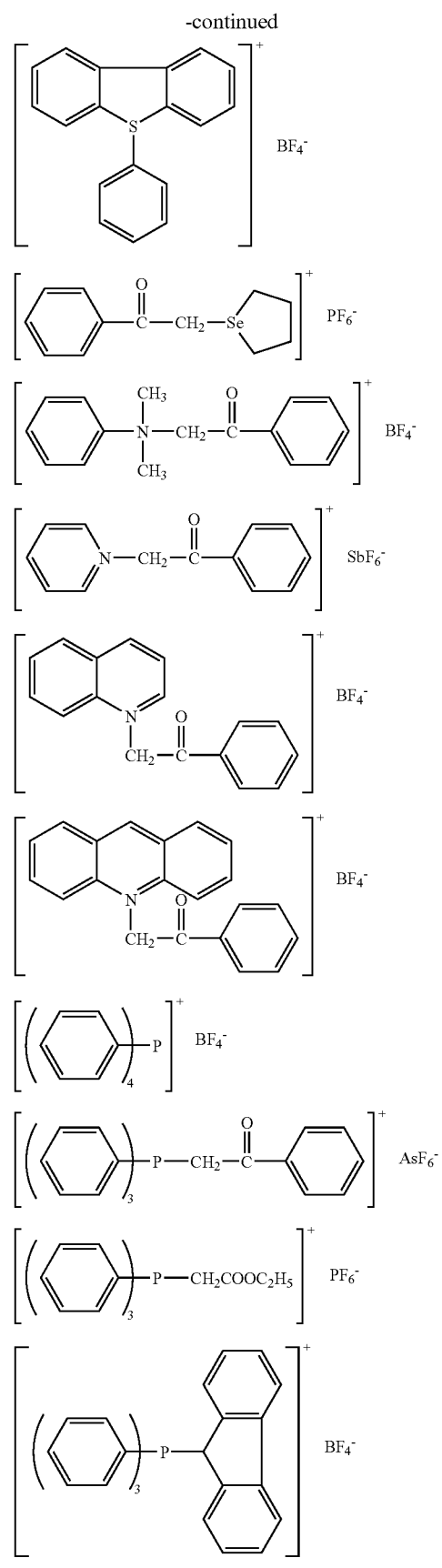

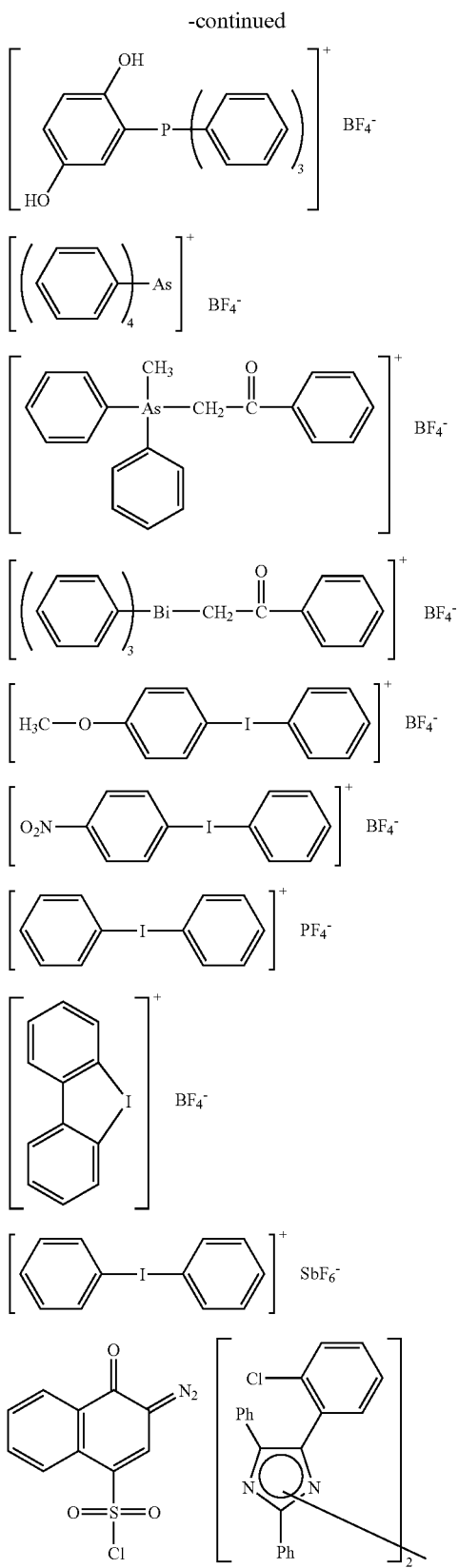
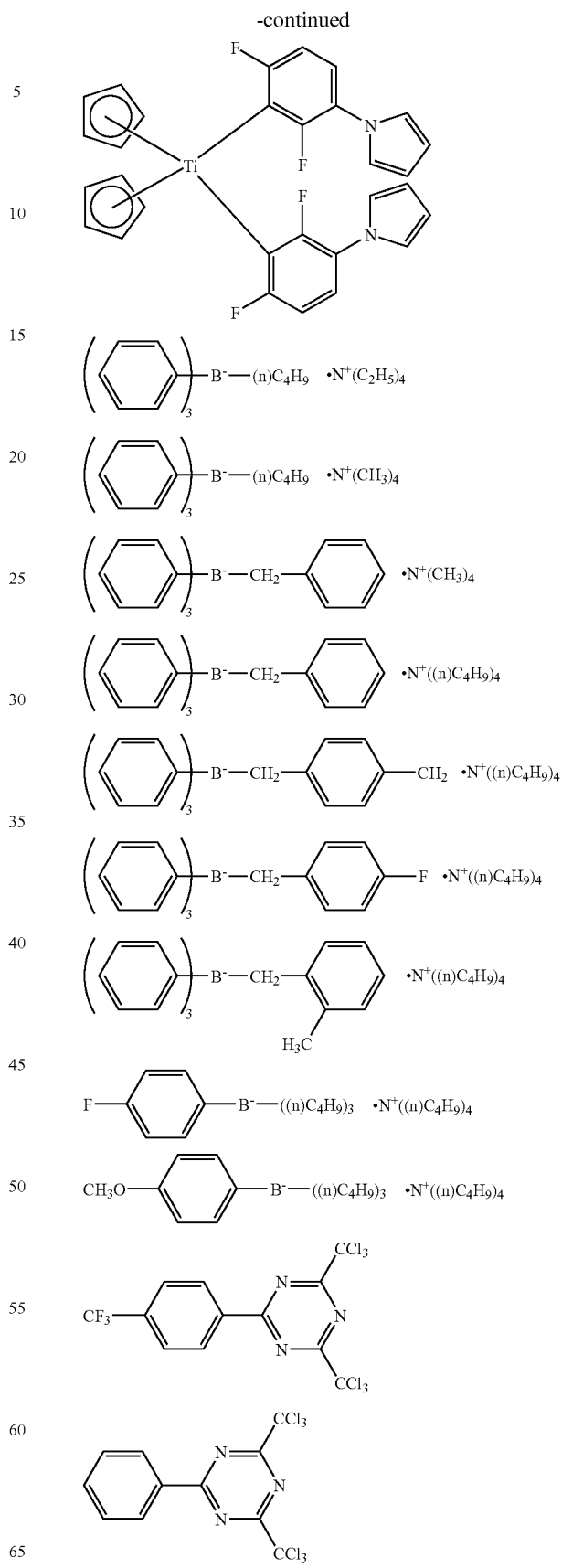

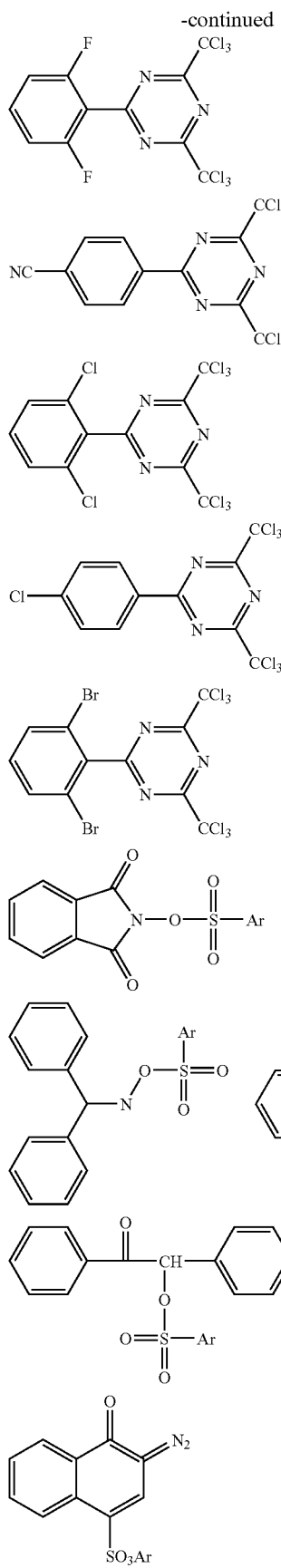
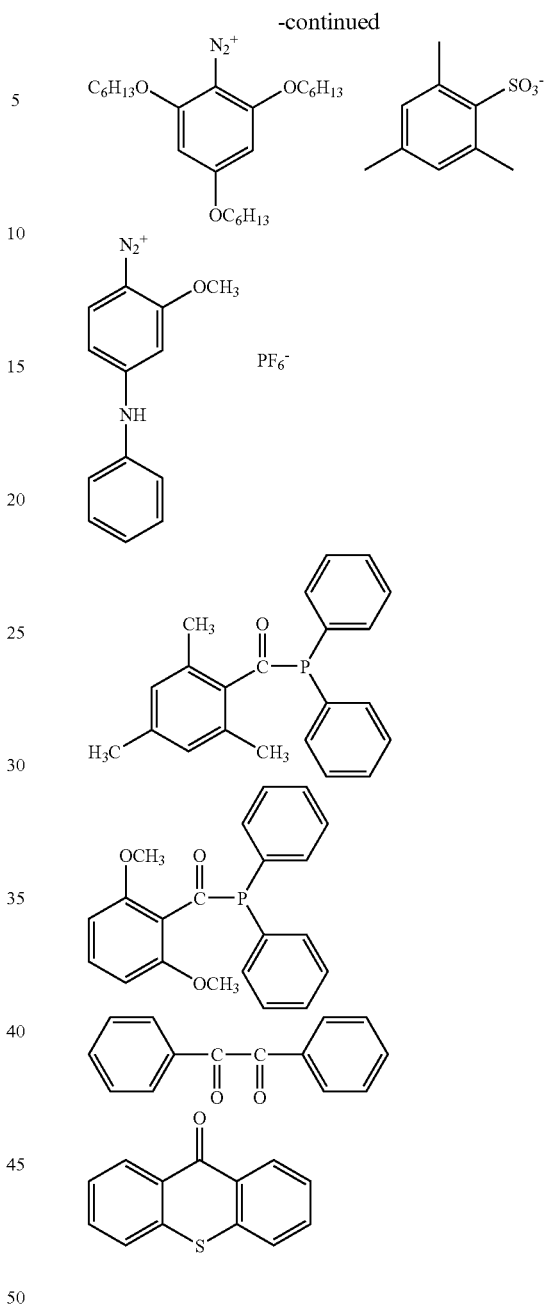

The polymerization initiators may be used alone or in combination of two or more. The concentration of the polymerization initiator is preferably 0.1 to 8.0% by mass, more preferably 1.0 to 7.0% by mass, and still more preferably 2.0 to 6.0% by mass by mass.

When the polymerization initiator is contained only in the ink spread suppressing liquid, use of a relatively low-molecular weight polymerization initiator is preferable for improvement of diffusion of the polymerization initiator. Favorable low-molecular weight polymerization initiators superior in hardening efficiency include TPO-L (exemplary compound, initiator-1)), Irgacure 1870, DAROCUR TPO (manufactured by Ciba Specialty Chemicals), and others.

When the polymerization initiator is contained only in the ink spread suppressing liquid, the concentration of the polymerization initiator therein is preferably 1 to 20% by mass, more preferably 2.0 to 15.0% by mass, and still more preferably 3.0 to 10.0% by mass by weight.

(Sensitization Dye)

A sensitization dye may be added to at least one of the recording and ink spread suppressing liquids according to the invention as needed for improvement in sensitivity of the photopolymerization initiator. The sensitization colorant is preferably contained in the ink spread suppressing liquid containing a photopolymerization initiator, from the viewpoint of liquid stability.

Preferable examples of the sensitizing dye include those belonging to the following compound classes and having absorption wavelengths in the range of 350 to 450 nm: multinuclear aromatics (e.g., pyrene, perylene, and triphenylene), xanthenes (e.g., fluorescein, eosin, erythrosine, rhodamine B, and Rose Bengal), cyanines (e.g., thiacarbocyanine and oxacarbocyanine), merocyanines (e.g., merocyanine and carbomerocyanine), thiazines (e.g., thionine, methylene blue, and toluidine blue), acridines (e.g., acridine orange, chloroflavin, and acryflavin), anthraquinones (e.g., anthraquinone), squaliums (e.g., squalium), coumarins (e.g., 7-diethylamino-4-methyl coumarin).

More preferable examples of the sensitizing dye include compounds represented by the following formulae (IX) to (XIII):

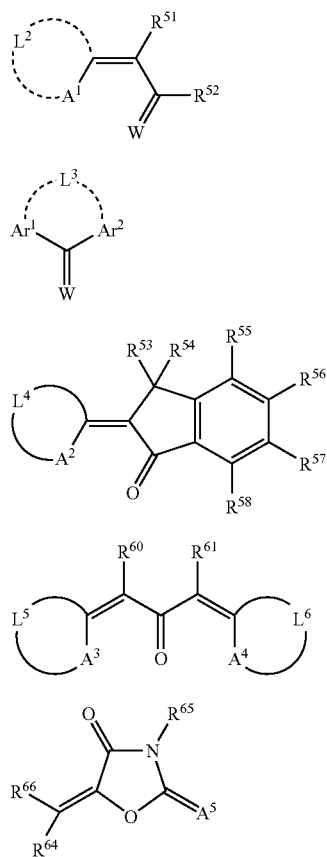

In formula (IX), $A^1$ represents a sulfur atom or $NR^{50}$, $R^{50}$ represents an alkyl group or an aryl group, $L^2$ represents a nonmetallic atomic group which, together with $A^1$ and the carbon atom adjacent thereto, forms a basic nucleus of a dye, $R^{51}$ and $R^{52}$ each independently represent a hydrogen atom or a monovalent nonmetallic atomic group, $R^{51}$ and $R^{52}$ may be bound to each other to form an acidic nucleus of a dye, and W represents an oxygen atom or a sulfur atom.

In formula (X), $Ar^1$ and $Ar^2$ each independently represent an aryl group, and are bound to each other via a linkage -$L^3$- which represents —O— or —S—. W has the same definition as in formula (IX).

In formula (XI), $A^2$ represents a sulfur atom or $NR^{59}$, $L^4$ represents a nonmetallic atomic group which, together with $A^2$ and the carbon atom adjacent thereto, forms a basic nucleus of a dye, $R^{53}$, $R^{54}$, $R^{55}$, $R^{56}$, $R^{57}$ and $R^{58}$ each independently represent a monovalent nonmetallic atomic group, and $R^{59}$ represents an alkyl group or an aryl group.

In formula (XII), $A^3$ and $A^4$ each independently represent —S— or —$NR^{62}$— or —$NR^{63}$—. $R^{62}$ and $R^{63}$ each independently represent a substituted or unsubstituted alkyl group or a substituted or unsubstituted aryl group. $L^5$ represent a nonmetallic atomic group which, together with $A^3$ and the carbon atom adjacent thereto, forms a basic nucleus of a dye. $L^6$ represent a nonmetallic atomic group which, together with $A^4$ and the carbon atom adjacent thereto, forms a basic nucleus of a dye. $R^{60}$ and $R^{61}$ each independently represent a hydrogen atom or a monovalent nonmetallic atomic group, or $R^{60}$ and $R^{61}$ are bound to each other to form an aliphatic or aromatic cycle.

In formula (XIII), $R^{66}$ represents an optionally substituted aromatic cycle or heterocycle, $A^5$ represents an oxygen atom, a sulfur atom, or —$NR^{67}$—. $R^{64}$, $R^{65}$, and $R^{67}$ each independently represent a hydrogen atom or a monovalent nonmetallic atomic group. $R^{67}$ and $R^{64}$ may be bonded to each other to form an aliphatic or aromatic ring. $R^{65}$ and $R^{67}$ may be bonded to each other to form an aliphatic or aromatic cycle.

Preferable specific examples of the compounds represented by formulae (IX) to (XIII) include exemplary compounds (A-1) to (A-20) shown below:

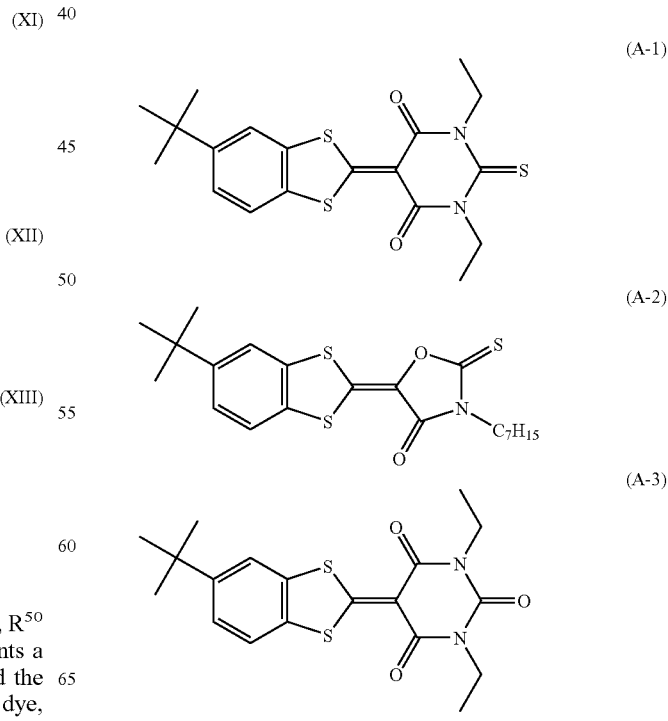

-continued
(A-4)
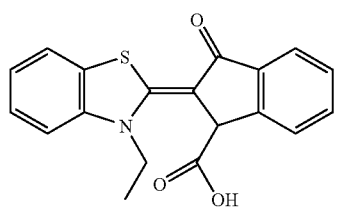
(A-5)
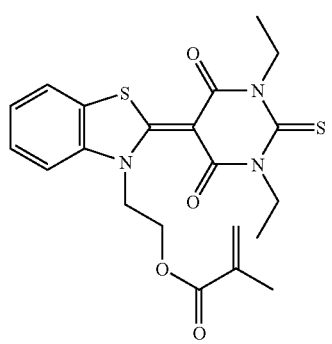
(A-6)
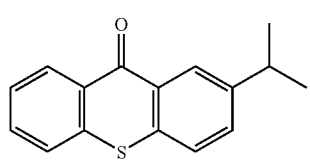
(A-7)
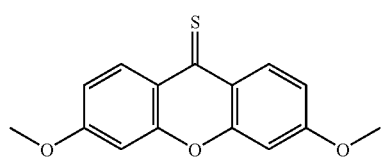
(A-8)
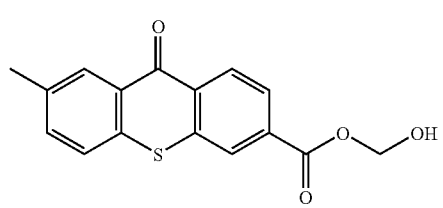
(A-9)
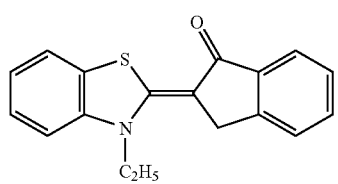
(A-10)
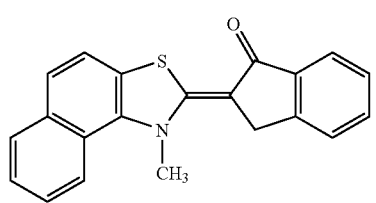
-continued
(A-11)
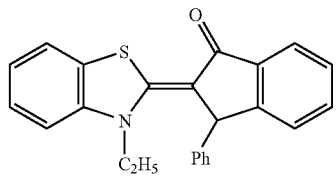
(A-12)
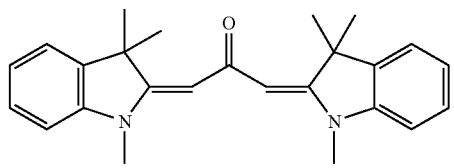
(A-13)
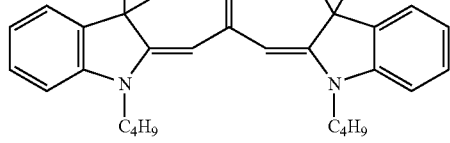
(A-14)
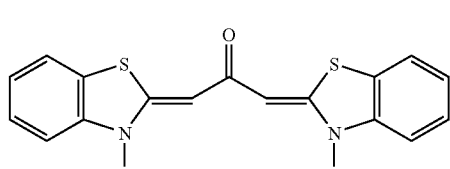
(A-15)
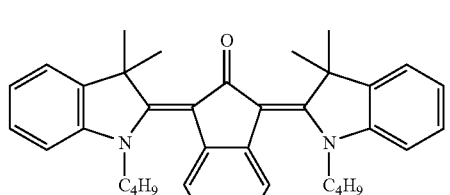
(A-16)
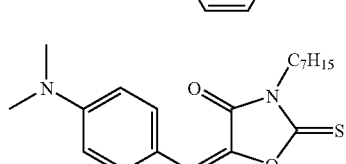
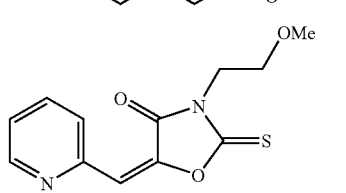
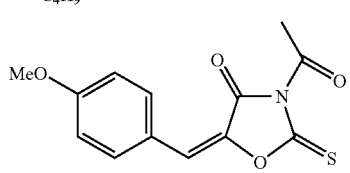
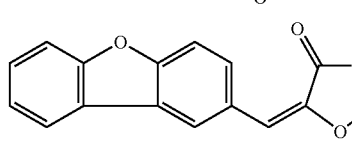

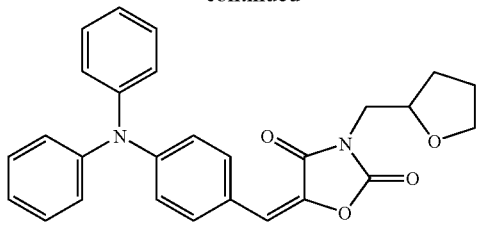

(Cosensitizer)

In addition, a known compound for further improvement in sensitivity or prevention of the polymerization inhibition by oxygen may be added as a cosensitizer to at least one of the recording and ink spread suppressing liquids according to the invention. The cosensitizer is also preferably contained in the ink spread suppressing liquid containing the photopolymerization initiator, similarly to the sensitization dye, from the viewpoint of liquid stability.

Examples of the cosensitizer include the amines described, for example, in M. R, Sander et al., "Journal of Polymer Society" 10, p. 3173, (1972), JP-B No. 44-20189, JP-A Nos. 51-82102, 52-134692, 59-138205, 60-84305, 62-18537, and 64-33104 and Research Disclosure 33825 (the disclosures of which are incorporated herein by reference); and specific examples thereof include triethanolamine, ethyl p-dimethylaminobenzoate, p-formyldimethylaniline, and p-methylthiodimethylaniline.

Other examples of the cosensitizer include thiols and sulfides, for example, the thiol compounds described in JP-A No. 53-702, JP-B No. 55-500806, and JP-A No. 5-142772 (the disclosures of which are incorporated herein by reference), and the disulfide compounds described in JP-A No. 56-75643 (the disclosure of which is incorporated herein by reference); and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g., N-phenylglycine), the organic metal compounds described in JP-B No. 48-42965 (e.g., tributyltin acetate), the hydrogen donors described in JP-B No. 55-34414, the sulfur compounds described in JP-A No. 6-308727 (e.g., trithiane), the phosphorus compounds described in JP-A No. 6-250387 (e.g., diethyl phosphite), and the Si—H and Ge—H compounds described in JP-A No. 8-65779.

Various other additives may be added to at least one of the recording liquid and ink spread suppressing liquids of the invention according to applications, in addition to the essential components and optional components such as polymerization initiator and the sensitization dye and the cosensitizer used in combination with the polymerization initiator. For example, use of an ultraviolet absorbent is preferable, for improvement of the weather resistance and prevention of the color deterioration of the image obtained. In addition, an antioxidant may be added for improvement in stability of one of the recording liquid and ink spread suppressing liquids.

Various organic and metal-complex discoloration inhibitors, a conductive salt such as potassium thiocyanate, lithium nitrate, ammonium thiocyanate, or dimethylamine hydrochloride for control of injection physical properties, and an extremely trace amount of organic solvent for improvement in adhesiveness to the recording medium may be added to at least one of the recording and ink spread suppressing liquids according to the invention.

At least one of the recording liquid and ink spread suppressing liquid according to the invention may further contain a polymer compound selected from various polymer compounds for the purpose of the adjustment of the film physical properties. Examples of polymer compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinyl resins, acrylic resins, rubber resin, waxes, and other natural resins. The polymer compounds may be used in combination of two or more.

One or more substances selected from nonionic surfactants, cationic surfactants, and organic fluorocompounds may be added to control the liquid properties.

Other examples of usable additives, which may be added as necessary, include leveling additives, matting agents, waxes for controlling the film properties, and tackifiers, which do not inhibit polymerization, for improving the adhesion to recording media such as polyolefin and PET.

(High-boiling Point Organic Solvent)

In the invention, a high-boiling point organic solvent may be added to at least one of the recording liquid and the ink spread suppressing liquid, but, as described above, the high-boiling point organic solvent is preferably added to the ink spread suppressing liquid for reduction in the amount of volatile organic compounds (VOC) emitted.

The high-boiling point organic solvent is preferably a solvent having (1) a viscosity of 100 mPa·s or less at 25° C., or a viscosity of 30 mPa·s or less at 60° C., and (2) a boiling point of higher than 100° C.

A high-boiling point organic solvent not satisfying any one of the conditions of (1) has an increased viscosity, making ejection of the ink on recording medium difficult, and a high-boiling point organic solvent not satisfying the condition in boiling point (2) has an excessively lower boiling point, leading to vaporization during image recording and consequently to decrease of the advantageous effects of the invention.

For the conditions as described in above (1), the viscosity at 25° C. is preferably in the range of 70 mPa·s or lower, more preferably, in the range of 40 mPa·s or lower, and most preferably in the range of 20 mPa·s or lower. The viscosity at 60° C. is preferably in the range of 20 mPa·s or lower, and most preferably in the range of 10 mPa·s or lower. For the conditions as described in above (2), the boiling point is more preferably in the range of 150° C. or higher, and most preferably in the range of 170° C. or higher. The lower limit of the melting point is preferably in the range of 80° C. or lower. Furthermore, the solubility of water (25° C.) is preferably 4 g or less, more preferably in the range of 3 g or less, further preferably in the range of 2 g or less, and most preferably in the range of 1 g or less.

The above-described "viscosity" has been determined using a RE80 type, viscometer (manufactured by Toki Sangyo Co., Ltd.). The RE80 type viscometer is a conical-frustum type viscometer corresponding to an E type. The viscosity was measured at a rotational speed of 10 r.p.m. using a rotor of rotor code No. 1. The rotational speed was as necessary changed to 5 r.p.m., 2.5 r.p.m., 1 r.p.m., 0.5 r.p.m., or others for measuring solvents having a viscosity higher than 60 mPa·s.

"Solubility of water" refers to the saturation density of water in a high-boiling point organic solvent at 25° C., and means the mass (g) of water soluble in 100 g of the high-boiling point organic solvent at 25° C.

As the above-described high-boiling point organic solvent, the compounds represented by the following formulae [S-1] to [S-9] are preferable.

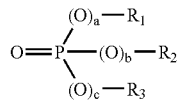  Formula [S-1]

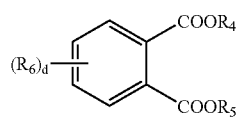  Formula [S-2]

  Formula [S-3]

  Formula [S-4]

  Formula [S-5]

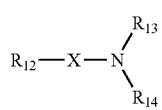  Formula [S-6]

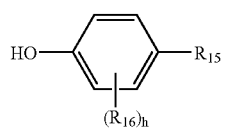  Formula [S-7]

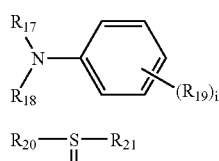  Formula [S-8]

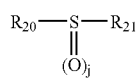  Formula [S-9]

In the above-described formula [S-1], $R_1$, $R_2$ and $R_3$ each independently represent an aliphatic group or an aryl group. a, b, and c each independently represent 0 or 1.

In the formula [S-2], $R_4$ and $R_5$ each independently represent an aliphatic group or an aryl group, $R_6$ represents a halogen atom (F, Cl, Br, I, hereinafter the same), an alkyl group, an alkoxy group, an aryloxy group, an alkoxycarbonyl group, or an aryloxycarbonyl group, and d represents an integral number of 0 to 3. When d is two or more, a plurality of $R_6$s may be the same or different from each other.

In the formula [S-3], Ar represents an aryl group, e represents an integral number of 1 to 6, and $R_7$ represents a hydrocarbon group having a valence of e or hydrocarbon groups linked each other by an ether bond.

In the formula [S-4], $R_8$ represents an aliphatic group, f represents an integral number of 1 to 6, and $R_9$ represents a hydrocarbon group having a valence of f or hydrocarbon groups linked each other by an ether bond.

In the formula [S-5], g represents an integral number of 2 to 6, $R_{10}$ represents a hydrocarbon group having a valence of g (excluding an aryl group), and $R_{11}$ represents an aliphatic group or an aryl group.

In the formula [S-6], $R_{12}$, $R_{13}$ and $R_{14}$ each-independently represent hydrogen atom, an aliphatic group, or an aryl group. X represents —CO— or —$SO_2$—. $R_{12}$ and $R_{13}$ or $R_{13}$ and $R_{14}$ may be linked each other to form a ring.

In the formula [S-7], $R_{15}$ represents an aliphatic group, an alkoxycarbonyl group, an aryloxycarbonyl group, an alkyl-sulfonyl group, an arylsulfonyl group, an aryl group or a cyano group, $R_{16}$ represents a halogen atom, an aliphatic group, an aryl group, an alkoxy group or an aryloxy group, h represents an integral number of 0 to 3. When h is two or more, a plurality of $R_{16}$s may be the same or different.

In the formula [S-8], $R_{17}$ and $R_{18}$ each independently represent an aliphatic group or an aryl group, $R_{19}$ represents a halogen atom, an aliphatic group, an aryl group, an alkoxy group, or an aryloxy group, i represents an integral number of 0 to 5. When i is two or more, a plurality of $R_{19}$s may be the same or different from each other.

In the formula [S-9], $R_{20}$ and $R_{21}$ each independently represent an aliphatic group or an aryl group. j represents 1 or 2. $R_{20}$ and $R_{21}$ may be linked each other to form a ring.

In the formulae [S-1] to [S-9], when $R_1$ to $R_6$, $R_8$, $R_{11}$ to $R_{21}$ are group containing an aliphatic group or an aliphatic group, the aliphatic group may be straight-chain, branched-chain, or cyclic, and may contain unsaturated bonds or have substituents. Examples of the substituent include a halogen atom, an aryl group, an alkoxy group, an aryloxy group, an alkoxycarbonyl group, a hydroxy group, an acyloxy group, and an epoxy group.

In the formulae [S-1] to [S-9], when $R_1$ to $R_6$, $R_8$, $R_{11}$ to $R_{21}$ are cyclic aliphatic groups, namely cycloalkyl groups or groups containing a cycloalkyl group, the cycloalkyl group may contain unsaturated bonds within a 3- to 8-membered ring, and may have substituents or crosslinking groups. Examples of the substituent include a halogen atom, an aliphatic group, a hydroxy group, an acyl group, an aryl group, an alkoxy group, and an epoxy group, and examples of the crosslinking group include methylene, ethylene, and isopropylidene.

In the formulae [S-1] to [S-9], when $R_1$ to $R_6$, $R_8$, $R_{11}$ to $R_{21}$ Ar, are aryl groups or groups containing an aryl group, the aryl group may be substituted with a substituent such as a halogen atom, an aliphatic group, an aryl group, an alkoxy group, an aryloxy group, and alkoxycarbonyl group.

In the formulae [S-3], [S-4], and [S-5], when $R_7$, $R_9$ or $R_{10}$ is a hydrocarbon group, the hydrocarbon group may contain a cyclic structure (e.g., a benzene ring, a cyclopentane ring, a cyclohexane ring) or an unsaturated bond, and may have substituents. Examples of the substituent include a halogen atom, a hydroxy group, an acyloxy group, an aryl group, an alkoxy group, an aryloxy group, and epoxy group.

Among the high-boiling point organic solvents represented by the formulae [S-1] to [S-9], the most preferable high-boiling point organic solvents are further described below.

In the formula [S-1], $R_1$, $R_2$, and $R_3$ are each independently preferably an aliphatic group having 1 to 24 (preferably 4 to 18) carbon atoms (e.g., n-butyl, n-hexyl, n-octyl, EH-octyl, 2-ethylhexyl, 3,3,5-trimethylhexyl, 3,5,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, and 4-methylcyclohexyl), or an aryl group having 6 to 24 (preferably 6 to 18) carbon atoms (e.g., phenyl, cresyl, p-nonyl phenyl, xylyl, cumenyl, p-methoxyphenyl, and p-methoxycarbonylphenyl). Among them, $R_1$, $R_2$, and $R_3$ are most preferably n-hexyl, n-octyl, EH-octyl, 2-ethylhexyl, 3,5,5-trimethylhexyl, n-dodecyl, 2-chloroethyl, 2-butoxyethyl, cyclohexyl, phenyl, cresyl, p-nonyl phenyl, or cumenyl.

Each of a, b, and c represents 0 or 1, and more preferably all of a, b, and c are 1.

In the formula [S-2], $R_4$ and $R_5$ are each independently preferably an aliphatic group having 1 to 24 (preferably 4 to 18) carbon atoms (e.g., the aliphatic groups as listed for the above-described $R_1$, heptyl, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, menthyl, bornyl, 1-methylcyclohexyl), or an aryl group having 6 to 24 (preferably 6 to 18) carbon atoms (e.g., the aryl groups as listed for the above-described $R_1$, 4-t-butylphenyl, 4-t-octylphenyl, 1,3,5-trimethylphenyl, 2,4,-di-t-butylphenyl, and 2,4,-di-t-pentyl phenyl). Among them, $R_4$ and $R_5$ are more preferably an aliphatic group, and most preferably n-butyl, heptyl, 2-ethylhexyl, n-dodecyl, 2-butoxyethyl, or ethoxycarbonylmethyl.

$R_6$ is preferably a halogen atom (preferably, a chlorine atom), an alkyl group having 1 to 18 carbon atoms (e.g., methyl, isopropyl, t-butyl, and n-dodecyl), an alkoxy group having 1 to 18 carbon atoms (e.g., methoxy, n-butoxy, n-octyloxy, methoxyethoxy, and benzyloxy), an aryloxy group having 6 to 18 carbon atoms (e.g., phenoxy, p-tolyloxy, 4-methoxyphenoxy, and 4-t-butylphenoxy), an alkoxycarbonyl group having 2 to 19 carbon atoms (e.g., methoxycarbonyl, n-butoxycarbonyl, 2-ethylhexyloxycarbonyl), or an aryloxycarbonyl group having 6 to 25 carbon atoms. Among them, $R_6$ is more preferably an alkoxycarbonyl group, and most preferably n-butoxycarbonyl.

d is 0 or 1.

In the formula [S-3], Ar is preferably an aryl group having 6 to 24 (preferably 6 to 18) carbon atoms (e.g., phenyl, 4-chlorophenyl, 2,4-dichlorophenyl, 4-methoxyphenyl, 1-naphthyl, 4-n-butoxyphenyl, 1,3,5-trimethylphenyl, and 2-(2-n-butoxycarbonylphenyl)phenyl). Among them, Ar is more preferably phenyl, 2,4-dichlorophenyl, or 2-(2-n-butoxy carbonyl phenyl)phenyl.

e is an integral number of 1 to 4 (preferably 1 to 3).

$R_7$ is preferably a hydrocarbon group having a valence of e and having 2 to 24 (preferably 2 to 18) carbon atoms [e.g., the aliphatic groups as listed for the above-described $R_4$, n-octyl, the aryl groups as listed for the above-described $R_4$, —(CH$_2$)$_2$—, the following groups,

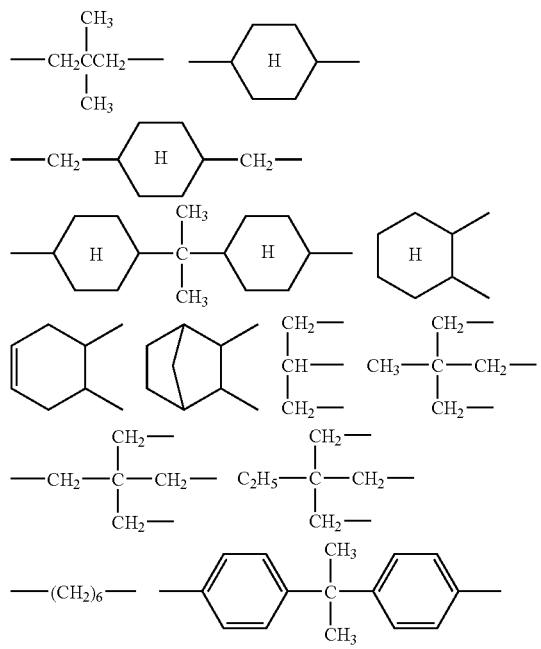

or hydrocarbon groups having a valence of e and having 4 to 24 (preferably 4 to 18) carbon atoms which are linked each other by an ether bond [e.g., —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$— or the following groups].

Among them, $R_7$ is more preferably an alkyl group, and most preferably n-butyl, n-octyl, or 2-ethylhexyl.

In the formula [S-4], $R_8$ is preferably an aliphatic group having 1 to 24 (preferably 1 to 17) carbon atoms (e.g., methyl, n-propyl, 1-hydroxyethyl, 1-ethylpentyl, n-heptyl, n-undecyl, n-tridecyl, pentadecyl, 8,9-epoxy heptadecyl, cyclopropyl, cyclohexyl, and 4-methylcyclohexyl). Among them, $R_8$ is most preferably n-heptyl, n-tridecyl, 1-hydroxy ethyl, 1-ethylpentyl, or 8,9-epoxyheptadecyl.

f is an integral number of 1 to 4 (preferably 1 to 3).

$R_9$ is preferably a hydrocarbon group having a valence of f and having 2 to 24 (preferably 2 to 18) carbon atoms, or hydrocarbon groups having a valence of f and 4 to 24 (preferably 4 to 18) carbon atoms which are linked each other by an ether bond (e.g., the groups as listed for the above-described $R_7$, 1-methyl-2-methoxyethyl, and 2-hexyldecyl). Among them, $R_9$ is most preferably 2-ethylhexyl, 2-hexyldecyl, or 1-methyl-2-methoxyethyl or the following groups.

In the formula [S-5], g is 2 to 4 (preferably 2 or 3).

$R_{10}$ is preferably a hydrocarbon group having a valence of g [for example, —CH$_2$—, —(CH$_2$)$_2$—, —(CH$_2$)$_4$—, —(CH$_2$)$_7$—, or —(CH$_2$)$_8$— or the following groups].

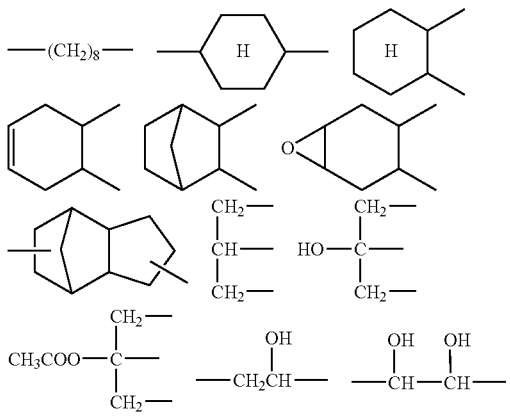

Among them, $R_{10}$ is most preferably, —$(CH_2)_4$— or —$(CH_2)_8$— or the following groups.

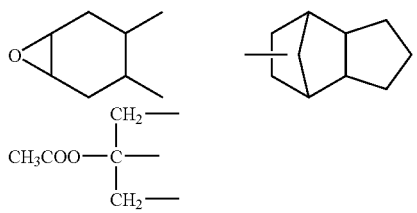

$R_{11}$ is preferably an aliphatic group having 1 to 24 (preferably 4 to 18) carbon atoms, or aryl group having 6 to 24 (preferably 6 to 18) carbon atoms (e.g., the aliphatic groups and aryl groups as listed for the above-described $R_4$). Among them, $R_{11}$ is more preferably an alkyl group, and most preferably n-butyl, n-octyl, or 2-ethylhexyl.

In the formula [S-6], $R_{12}$ is preferably hydrogen atom, an aliphatic group having 1 to 24 (preferably 3 to 20) carbon atoms [e.g., n-propyl, 1-ethyl pentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, 4-methylcyclohexyl, and 8-N,N-diethylcarbamoyloctyl], or an aryl group having 6 to 24 (preferably 6 to 18) carbon atoms (e.g., the aryl group as listed for the above-described Ar, 3-methylphenyl, and 2-(N,N-di-n-octylcarbamoyl)phenyl). Among them, $R_{12}$ is most preferably n-undecyl, 8-N,N-diethylcarbamoyloctyl, 3-methylphenyl, or 2-(N,N-di-n-octylcarbamoyl)phenyl.

$R_{13}$ and $R_{14}$ are each preferably hydrogen atom, an aliphatic group having 1 to 24 (preferably 1 to 18) carbon atoms (e.g., methyl, ethyl, isopropyl, n-butyl, n-hexyl, n-octyl, 2-ethylhexyl, n-dodecyl, n-tetradecyl, cyclopentyl, and cyclopropyl), or an aryl group having 6 to 18 (preferably 6 to 15) carbon atoms (e.g., phenyl, 1-naphthyl, and p-tolyl). Among them, $R_{13}$ and $R_{14}$ are each most preferably methyl, ethyl, n-butyl, n-octyl, n-tetradecyl, or phenyl. $R_{13}$ and $R_{14}$ may be linked each other to form a pyrrolidine ring, a piperidine ring, or a morpholine ring together with N. $R_{12}$ and $R_{13}$ may be linked each other to form a pyrrolidone ring or a piperidine ring together with N.

X is —CO— or —SO$_2$—, and preferably X is —CO—.

In the formula [S-7], $R_{,5}$ is preferably an aliphatic group having 1 to 24 (preferably 3 to 18) carbon atoms (e.g., methyl, isopropyl, t-butyl, t-pentyl, t-hexyl, t-octyl, 2-butyl, 2-hexyl, 2-octyl, 2-dodecyl, 2-hexadecyl, t-pentadecyl, cyclopentyl, and cyclohexyl), an alkoxycarbonyl group having 2 to 24 (preferably 5 to 17) carbon atoms (e.g., n-butoxycarbonyl, 2-ethylhexyloxycarbonyl, and n-dodecyloxycarbonyl), an aryloxycarbonyl group having 7 to 24 (preferably 7 to 18) carbon atoms (e.g., phenoxycarbonyl group, naphthoxycarbonyl group, and cresyloxycarbonyl group), an alkylsulfonyl group having 1 to 24 (preferably 1 to 18) carbon atoms (e.g., methylsulfonyl, n-butylsulfonyl, and n-dodecylsulfonyl), an arylsulfonyl group having 6 to 30 (preferably 6 to 24) carbon atoms (e.g., p-tolylsulfonyl, p-dodecylphenylsulfonyl, and p-hexadecyloxyphenylsulfonyl), an aryl group having 6 to 32 (preferably 6 to 24) carbon atoms (e.g., phenyl and p-tolyl), or a cyano group. Among them, $R_{15}$ is more preferably an aliphatic group having 1 to 24 carbon atoms or an alkoxycarbonyl group having 2 to 24 carbon atoms, and most preferably an aliphatic group having 1 to 24 carbon atoms.

$R_{16}$ is preferably a halogen atom (preferably Cl), an aliphatic group having 1 to 24 (preferably 1 to 18) carbon atoms {more preferably, an alkyl group (e.g., the alkyl group as listed for the above-described $R_{15}$), a cycloalkyl group having 3 to 18 (more preferably 5 to 17) carbon atoms (e.g., cyclopentyl and cyclohexyl)}, an aryl group having 6 to 32 (preferably 6 to 24) carbon atoms (e.g., phenyl and p-tolyl), an alkoxy group having 1 to 24 (preferably 1 to 18) carbon atoms (e.g., methoxy, n-butoxy, 2-ethylhexyloxy, benzyloxy, n-dodecyloxy, n-hexadecyloxy), or an aryloxy group having 6 to 32 (preferably 6 to 24) carbon atoms (e.g., phenoxy, p-t-butylphenoxy, p-t-octylphenoxy, m-pentadecylphenoxy, and p-dodecyloxyphenoxy). Among them, $R_{16}$ is more preferably an aliphatic group having 1 to 24 carbon atom, and most preferably an aliphatic group having 1 to 12 carbon atoms.

h is an integral number of 1 to 2.

In the formula [S-8], preferable examples of $R_{17}$ and $R_{18}$ are the same as those listed for the above-described $R_{13}$ and $R_{14}$ except for hydrogen atom. Among them, $R_{17}$ and $R_{18}$ are each more preferably an aliphatic group, and most preferably n-butyl, n-octyl, or n-dodecyl. $R_{17}$ and $R_{18}$ cannot be linked each other to form a ring.

Preferable examples of $R_{19}$ are the same as those listed for the above-described $R_{16}$. Among them, $R_{19}$ is more preferably an alkyl group or an alkoxy group, and most preferably n-octyl, methoxy, n-butoxy, or n-octyloxy.

i is an integral number of 1 to 5.

In the formula [S-9], preferable examples of $R_{20}$ and $R_{21}$ are the same as those listed for the above-described $R_1$, $R_2$, and $R_3$ when they do not form a ring. Among them, $R_{20}$ and $R_{21}$ are most preferably a substituted or nonsubstituted aliphatic group having 1 to 24 carbon atoms. $R_{20}$ and $R_{21}$ may be linked each other to form a ring, and the formed ring has preferably 3 to 10 members, and most preferably 5 to 7 members.

j represents 1 or 2, and preferably j is 1.

Specific examples of the high-boiling point organic solvent (compounds S-1 to S-53), and the viscosity (measured at temperatures of 25° C. and 60° C. using the above-described means; mPa·s) and boiling point (° C.) of the high-boiling point organic solvents are summarized below.

The boiling point of the high-boiling point organic solvents has been calculated by converting from the boiling point during distillation under reduced pressure to that under normal pressure. In the following specific examples, the compounds whose boiling point is not shown have been confirmed not to boil at 170° C., and the compounds whose viscosity at 25° C. is not shown are solid at 25° C.

| | Viscosity (mPa·s) | | Boiling point (°C.) |
|---|---|---|---|
| | (25° C.) | (60° C.) | |
| Compound represented by Formula [S-1] | | | |
| S-1  O=P(—O—C₆H₅)₃ | — | 8.3 | 370 |
| S-2  O=P(—O—C₆H₄—CH₃)₃ | 57.6 | 11.8 | 435 |
| S-3  O=P(—O—C₆H₄—C₃H₇(i))₃ | 95 | 17.5 | 485 |
| S-4  O=P(—O—C₆H₅)₂(—O—C₆H₄—CH₃) | 65 | 12.8 | 435 |
| S-5  O=P(OC₁₀H₂₁)(—O—C₆H₄—C₉H₁₉(n))₂ | 49 | 10.3 | 435 |
| S-6  O=P(OCH₂CH(C₂H₅)C₄H₉(n))₃ | 11.7 | 4.0 | 390 |
| S-7  O=P(OCH₂CH₂CH(CH₃)CH₂C(CH₃)₃)₃ | 20.22 | 5.8 | 420 |
| S-8  O=P(OC₁₂H₂₅(n))₃ | 28.6 | 6.9 | 480 |
| S-9  O=P(OC₆H₁₃(n))₃ | 6.62 | 3.0 | 365 |
| S-10  O=P(OCH₂CH₂Cl)₃ | 20.8 | 5.5 | 360 |
| S-11  O=P(OCH₂CH₂OC₄H₉(n))₃ | 10.9 | 3.8 | 400 |
| S-12  ((EH)C₈H₁₇)₃P=O | 41.1 | 9.0 | — |
| S-13  (n)C₈H₁₇—P(=O)(OC₈H₁₇(n))₂ | 13.7 | 4.3 | — |
| Compound represented by Formula [S-2] | | | |
| S-14  C₆H₄(COOC₄H₉(n))₂ (ortho) | 20.3 | 5.1 | 370 |
| S-15  C₆H₄(COOC₇H₁₅ (branched))₂ (ortho) | 34.9 | 8.0 | 380 |

-continued
| | | Viscosity (mPa·s) | | Boiling |
| | | (25° C.) | (60° C.) | point (° C.) |
| --- | --- | --- | --- | --- |
| S-16 | 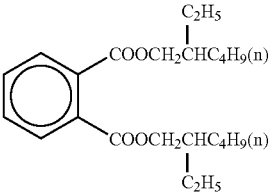 | 62.7 | 11.7 | 400 |
| S-17 | 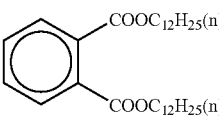 | 52.1 | 10.8 | — |
| S-18 | 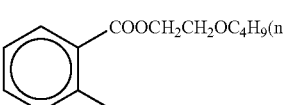 | 42 | 9.1 | 335 |
| S-19 | 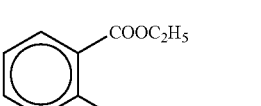 | 74 | 14.2 | 355 |
| S-20 | 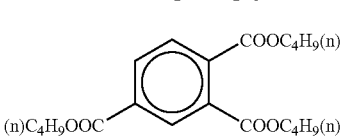 | 55.7 | 13.1 | 400 |
Compound represented by Formula[S-3]
| S-21 | 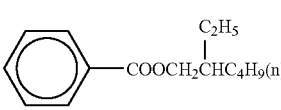 | 5.68 | 2.4 | 300 |
| --- | --- | --- | --- | --- |
| S-22 | 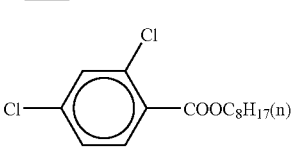 | 11.44 | 3.9 | 360 |
| S-23 | 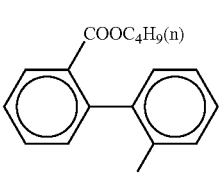 | 51.1 | 10.6 | — |
Compound represented by Formula[S-4]
| S-24 | 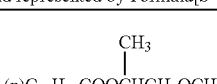 | 7.17 | 3.1 | 380 |
| --- | --- | --- | --- | --- |
| S-25 | 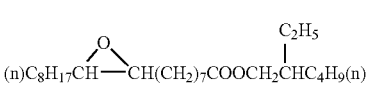 | 39.84 | 8.8 | — |
| S-26 | 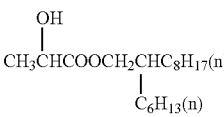 | 22.83 | 5.9 | — |

-continued

| | | Viscosity (mPa·s) | | Boiling point (°C) |
|---|---|---|---|---|
| | | (25° C.) | (60° C.) | |
| S-27 | (n)C$_4$H$_9$CHCOOCH$_2$CCH$_2$OCOCHC$_4$H$_9$(n) with C$_2$H$_5$, CH$_3$, C$_2$H$_5$ substituents and CH$_3$ | 12 | 4.0 | — |
| S-28 | (n)C$_4$H$_9$CHCOOCH$_2$—[cyclohexane, H]—CH$_2$OCOCHC$_4$H$_9$(n) with C$_2$H$_5$ substituents | 41.4 | 9.0 | 430 |
| S-29 | (n)C$_7$H$_{15}$COO—[bicyclic difuran]—OCOC$_7$H$_{15}$(n) | 47.3 | 10.0 | 440 |

Compound represented by Formula[S-4]

| | | | | |
|---|---|---|---|---|
| S-30 | (n)C$_4$H$_9$CHCH$_2$OCO(CH$_2$)$_4$COOCH$_2$CHC$_4$H$_9$(n) with C$_2$H$_5$ substituents | 11.7 | 4.3 | 390 |
| S-31 | (n)C$_4$H$_9$CHCH$_2$OCO(CH$_2$)$_8$COOCH$_2$CHC$_4$H$_9$(n) with C$_2$H$_5$ substituents | 19.9 | 6.1 | 410 |
| S-32 | (n)C$_4$H$_9$OCO(CH$_2$)$_8$COOC$_4$H$_9$(n) | 8.09 | 3.5 | 345 |
| S-33 | [epoxycyclohexane, H] with COOC$_8$H$_{17}$(n), COOC$_8$H$_{17}$(n) | 88.9 | 16.5 | — |
| S-34 | (n)C$_4$H$_9$OCO—[tricyclic]—COOC$_4$H$_9$(n) | 37.50 | 8.4 | 440 |
| S-35 | CH$_3$COO—C(CH$_2$COOC$_4$H$_9$(n))(COOC$_4$H$_9$(n))(CH$_2$COOC$_4$H$_9$(n)) | 42.7 | 9.3 | 390 |

Compound represented by Formula[S-6]

| | | | | |
|---|---|---|---|---|
| S-36 | (n)C$_{11}$H$_{23}$CON(C$_4$H$_9$(n))(C$_4$H$_9$(n)) | 9.45 | 3.6 | 340 |
| S-37 | hydantoin with C$_8$H$_{17}$(n), H$_3$C, OC$_{16}$H$_{33}$(n) substituents | 45.8 | 9.8 | — |
| S-38 | (n)C$_{14}$H$_{29}$—N-[piperidone] | 20.0 | 5.4 | 350 |

-continued
| | | Viscosity (mPa·s) | | Boiling point (° C.) |
|---|---|---|---|---|
| | | (25° C.) | (60° C.) | |
| S-39 | 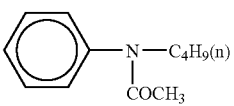 | 12.83 | 4.2 | 320 |
| S-40 | ((n)C$_8$H$_{17}$)$_2$NOC—⌬—CON(C$_8$H$_{17}$(n))$_2$ | 77.1 | 14.7 | — |
| S-41 | (C$_2$H$_5$)$_2$—NCO—(CH$_2$)$_8$—CON(C$_2$H$_5$)$_2$ | 40.7 | 8.9 | 405 |
| S-42 | 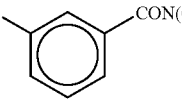 | 49.65 | 10.4 | — |
Compound represented by Formula[S-7]
| S-43 | 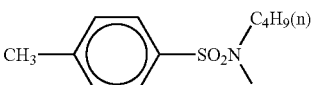 | 92 | 16.9 | — |
Compound represented by Formula[S-8]
| S-44 | 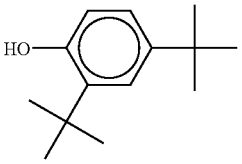 | 15.5 | 4.6 | — |
| S-45 | 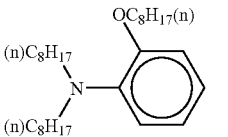 | 27.1 | 6.6 | — |
| S-46 | 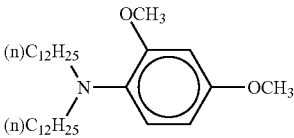 | 35.3 | 8.0 | — |
| S-47 | 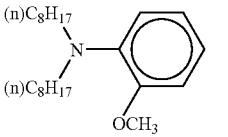 | 79.14 | 15.0 | — |
Compound represented by Formula[S-9]
| S-48 | 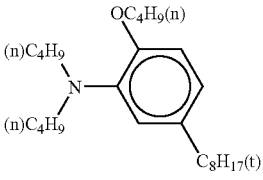 | 37.62 | 8.4 | — |

-continued

| | | Viscosity (mPa·s) | | Boiling |
|---|---|---|---|---|
| | | (25° C.) | (60° C.) | point (° C.) |
| S-49 | Ph–CH$_2$SOCHCOOC$_2$H$_5$ with C$_{12}$H$_{25}$(n) substituent | 43.1 | 9.3 | — |

Other compounds

| | | | | |
|---|---|---|---|---|
| S-50 | C$_n$H$_{2n+1}$ (normal paraffin, mixture of compounds wherein n is 14 or 15) (for example, "NP-SH", manufactured by Mitsui-Texaco Chemicals) | 2.47 | 0.4 | 260 |
| S-51 | benzene with OC$_6$H$_{13}$(n), C$_5$H$_{11}$(t), C$_5$H$_{11}$(t) substituents | 35.85 | 8.1 | 330 |
| S-52 | (Ph)$_2$P(=O)–N(C$_8$H$_{17}$(n))$_2$ | 45.9 | 9.8 | |
| S-53 | HO–C(CH$_2$COOC$_4$H$_9$(n))$_2$–COOC$_4$H$_9$(n) | 25.82 | 6.7 | — |

The high-boiling point organic solvent may be used alone or in combination of two or more thereof [e.g., tricresylphosphate and dibutyl phthalate, trioctylphosphate and di(2-ethylhexyl)sebacate, dibutyl phthalate and poly(N-t-butylacrylamide)].

Other examples of the high-boiling point organic solvents except for the above-described compounds, and the method for synthesizing these high-boiling point organic solvents are, for example, described in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321, and 5,013,639, European Patent Application Laid-Open (EP-A) Nos. 276,319A, 286,253A, 289,820A, 309,158A, 309,159A, 309,160A, 509,311A, and 510,576A, East German Patent Nos. 147,009, 157,147, 159,573, and 225,240A, U.K. Patent No. 2,091,124A, and JP-A Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946, and 4-346338.

In the present invention, high-boiling point organic solvents having a boiling point higher than 100° C. are preferable, and high-boiling point organic solvents having a boiling point higher than 170° C. are more preferable.

The amount of the addition of the high-boiling point organic solvent to the ink spread suppressing liquid is preferably in the range of 50% by mass to 100% by mass, more preferably 70% by mass to 100% by mass, and most preferably 90% by mass to 100% by mass based on the total weight of the liquid.

<Other Components>

In addition to the above-described components, known additives or the like may be added in accordance with the intended use.

Storage Stabilizer

Storage stabilizers may be added to the recording liquid and the ink spread suppressing liquid (preferably recording liquid) according to the present invention for the purpose of inhibiting undesirable polymerization during storage. The storage stabilizers are preferably used in combination with polymerizable compounds, and are preferably soluble in the contained droplets or liquids, or other coexisting components.

Examples of the storage stabilizer include quaternary ammonium salts, hydroxy amines, cyclic amides, nitrites, substituted ureas, heterocycle compounds, organic acids, hydroquinone, hydroquinone monoethers, organic phosphines, and copper compounds. Specific examples thereof include benzyltrimethylammonium chloride, diethylhydroxylamine, benzothiazole, 4-amino-2,2,6,6-tetramethylpiperidine, citric acid, hydroquinone monomethyl ether, hydroquinone monobutyl ether, and copper naphthenate.

The amount of addition of the storage stabilizer is preferably adjusted on the basis of the activity of the polymerization initiator, polymerizability of the polymerizable compounds, and the kind of the storage stabilizer, and preferably 0.005 to 1% by mass, more preferably 0.01 to 0.5% by mass, and further preferably 0.01 to 0.2% by mass on the basis of the solid content in the liquid, from the viewpoint of the balance between the storage stability and curability.

Electrically Conductive Salts

Electrically conductive salts are solid compounds for improving electrical conductivity. In the present invention, it is preferable not to substantially use the salts because they tend to precipitate during storage. However, they may be added in an appropriated amount when the solubility of the electrically conductive salts is improved by increasing the solubility of electrically conductive salts or using solvents with high solubility to the electrically conductive salts.

Examples of the above-described electrically conductive salts include potassium thiocyanate, lithium nitrate, ammonium thiocyanate, and dimethylamine hydrochloride salt.

Solvent

In the present invention, solvents other than the above-described high-boiling point organic solvents may be used. The solvents can be used for the purposes of adjusting the polarity, viscosity, and surface tension of the liquid (ink), improving the solubility and dispersibility of the colorants, adjusting electrical conductivity, and adjusting printing performance.

The solvents are preferably water-insoluble liquids containing no aqueous solvent for quick-drying properties and recording a high quality image having a uniform line width, thus the liquid (ink) preferably comprise an above-described high-boiling point organic solvent.

Examples of the solvent include low-boiling organic solvents having a boiling point of 100° C. or lower, but it is preferable not use such low-boiling organic solvents because they may affect the curability and may cause environmental pollution. If a low-boiling organic solvent is used, it is preferable to use a highly safe one. Highly safe solvents are solvents for which a high control concentration (an index defined in the work environmental evaluation criteria) has been defined. The control concentration is preferably 100 ppm or higher, more preferably 200 ppm or higher. Examples of the highly safe solvents include alcohols, ketones, esters, ethers, and hydrocarbon, and specific examples thereof include methanol, 2-butanol, acetone, methyl ethyl ketone, ethyl acetate, and tetrahydrofuran.

The solvents may be used alone or in combination of two or more thereof. However, when at least one of water and a low-boiling organic solvent is used, the content of them in each liquid is preferably 0 to 20% by mass, more preferably 0 to 10% by mass, and most preferably substantially free. It is not preferable that the recording liquid and the ink spread suppressing liquid according to the present invention contain water from the viewpoints of temporal stability such as development of unevenness with time, and development of liquid turbidity due to precipitation of dyes, and drying properties on an impermeable or slow-permeable recording medium. Substantially free means that the presence of inevitable impurities is acceptable.

Other Additives

Furthermore, known additives such as a polymer, a surface tension adjuster, an ultraviolet absorbing agent, an antioxidant, an antifading agent, and pH adjuster may be added into at least one of the recording liquid and ink spread suppressing liquid.

As surface tension adjusters, ultraviolet absorbing agent, antioxidant, antifading agent, and pH adjuster, known compounds may be used as appropriate. Specific examples thereof include the additives as described in JP-A No. 2001-181549.

In addition to the above-described compounds, a pair of compounds which react with each other by mixing to form an aggregate or thicken may be separately contained in the recording liquid and the ink spread suppressing liquid according to the present invention. The above-described pair of compounds has properties of rapidly forming an aggregate or rapidly thickening the liquid, thereby coalescence between neighboring droplets is more effectively inhibited.

Examples of the reaction between the above-described pair of compounds include an acid-base reaction, a hydrogen bond reaction between a carboxylic acid group-containing compound and an amide, a crosslinking reaction such as those between boronic acid and a diol, and a reaction by electrostatic interaction between a cation and an anion.

However, the concentration of the pair of compounds above is preferably 20% by mass or less, more preferably 10% by mass or less, and particularly preferably none, with respect to the total weight of the ink set from the viewpoint of safety.

(Ink-jet Recording Method)

Hereinafter, the ink-jet recording method according to the invention will be described.

The ink-jet recording method according to the invention include forming of an image on a recording medium by applying the recording liquid and the ink spread suppressing liquid by using the ink-jet recording ink set according to the invention (image forming step) and hardening of the formed image by applying energy thereto (hardening step).

As described above, when the ink-jet recording ink set is used, the ink spread suppressing liquid and the recording liquid overlaps and are mixed with each other on the recording medium, whereby a curing reaction of the polymerizable compound proceeds and image formation is carried out. Application of the energy then accelerates the polymerization and curing reaction, assuring efficient formation of a stronger image. Such energy is preferably applied by photoirradiation or heating.

Image Forming Step

In the image forming process, an image is formed according to a known recording method by using the ink-jet recording ink set, but the ink nozzle and others for use in the ink-jet recording method according to the invention are not particularly limited, and may be selected properly according to applications.

Any ink-jet recording process may be applied to the ink-jet recording method according to the invention. Examples thereof include an electric charge-controlled method of ejecting ink by electrostatic attraction, a drop-on-demand method (pressure pulse method) of using the vibrational pressure of a piezoelectric element, an acoustic ink-jet method of ejecting ink by converting electric information into acoustic beams, irradiating the beams on ink, and generating an radiation pressure, a thermal ink-jet method (bubble jet (registered trademark)) of forming air bubbles by the pressure generated by heating, and the like.

The ink-jet recording process also include a method of ejecting a so-called low-concentration photo ink multiple times in droplets in smaller volume, a method of improving image quality by using multiple different inks that are substantially the same in color tone and different concentration, and a method of using a transparent colorless ink.

In the ink-jet recording method according to the invention, an image is formed by applying the ink spread suppressing liquid on an area corresponding to the image to be formed on the recording medium with droplets of the recording liquid or an area wider than the area corresponding to the image, before application of the droplets of the recording liquid More preferably, after application of droplet n1 of the recording liquid, the next droplet n2 of recording liquid is applied on the area overlapping the droplet n1, and the ink spread suppressing liquid is applied on an area corresponding to the image to be formed on the recording medium with droplets of the recording liquid or an area wider than the area corresponding to the image, before application of the droplets of the recording liquid.

Specifically, preferable is a method of forming a desired image by applying droplets of the recording liquid n1, n2, etc. on the recording medium from an ink ejection nozzle (head) of ink-jet printer. The recording liquid preferably contains at least a colorant and a polymerizable compound for forming a desirable image, and droplets n1 and n2 are preferably applied respectively at the positions overlapping each other during application for obtaining a high image density. Then, an ink spread suppressing liquid containing a surfactant and substantially no colorant is applied on the same area where the desired image is to be formed on the recording medium or an area wider than that before application of the droplets n1 and n2.

The recording medium used in the ink-jet recording method according to the invention is not particularly limited, as will be described below, and may be an impermeable to slow-permeable recording medium. When an image is recorded on such a less ink-absorbing recording medium, neighboring droplets (n1 and n2) applied as overlapped for obtaining a high-density image may fuse to each other when in contact with each other on the medium before drying, causing image bleeding and fluctuation of thin line width, prohibiting formation of high-definition image.

By using the ink-jet recording ink set according to the invention, it is possible to prevent the fusion between the droplets n1 and n2 and to prevent image bleeding and fluctuation in the width of thin line image even when droplets n1 and 2 of the recording liquid are applied on the same region as overlapping each other. As a result, it is possible to form a high-definition line having a uniform width while preserving the density of the high-density image and thus to record a high-quality image. The image is less tacky and superior in abrasion resistance.

The impermeable recording medium refers to a medium which is substantially impermeable to droplets. "Substantially impermeable" means that the permeation rate measured one minutes after ink deposition is 5% or less. The slow-permeable recording medium refers to a medium on which the complete permeation of 10 pl (pico liter) of droplets takes 100 m seconds or more, and specific examples thereof include art paper. The detail of the impermeable or slow-permeable recording medium will be described later.

Permeable recording medium refers to a medium on which the complete permeation of 10 pl of droplets takes 100 m seconds or less, and specific examples thereof include plain paper and porous paper.

In forming an image in the invention, recording liquids including the droplets n1 and n2 and a ink spread suppressing liquid different in composition therefrom are used in combination. The droplets n1 and n2 of the recording liquid means droplets n1, n2, n3, ... nx ejected from an ink ejection nozzle by using the same recording liquid as they overlap each other. The droplets may be ejected simultaneously or stepwise, but preferably stepwise.

In the ink-jet recording method according to the invention, droplets n1 and n2 of the recording liquid described above are preferably ejected, for example, through an ink-jet nozzle, but the recording liquid may not be ejected through an ink-jet nozzle but may be applied by other means such as coating.

Hereinafter, the method of applying the ink spread suppressing liquid on a recording medium will be described. In the description below, a method of using an ink-jet nozzle was used as the method of applying the droplets n1 and n2 of the recording liquid as described above. Typical examples are shown below.

(i) Application With Coater

It is a preferable embodiment that the ink spread suppressing liquid is applied to a recording medium using a coater, subsequently the droplets a1 and a2 (the recording liquid) are applied by an ink jet nozzle to record an image.

The coater is not particularly limited, and can be appropriately selected from known coaters according to the intended use. Examples of the coater include an air doctor coater, a blade coater, a rod coater, a knife coater, a squeeze coater, an impregnation coater, a reverse roll coater, a transfer roll coater, a gravure coater, a kiss-roll coater, a cast coater, a spray coater, a curtain coater, and an extrusion coater. Details of the method may be referenced in "Coating Kogaku (Coating Engineering)", by Yuji Harasaki.

The ink jet nozzle is not particularly limited, and can be appropriately selected from known nozzles according to the intended use. The ejection by the ink jet nozzle will be described later.

Furthermore, liquids other than the droplet n1 and droplet n2 of the recording liquids and the ink spread suppressing liquid may be used for forming an image. The other liquids may be applied to a recording medium by any methods such as the above-described coating using coaters or ejection using an ink jet nozzle. The timing of application is not particularly limited. Another liquid containing a colorant is preferably injected using an ink jet nozzle, and preferably applied after applying the ink spread suppressing liquid.

(ii) Ejection With Ink Jet Nozzle

It is a preferred embodiment to record an image by applying the ink spread suppressing liquid as droplet b1, droplet b2, droplet b3, ... ,and droplet bx using an ink jet nozzle, followed by applying the droplet n1, droplet n2, droplet n3, ..., and droplet nx of the recording liquid using an ink jet nozzle. The ink jet nozzle is the same as described above.

In such a case too, the liquid other than the droplets n1 and n2 of the recording liquid and the ink spread suppressing liquid may be applied on the recording medium in any way, for example, in a coating machine or by ejection through an ink-jet nozzle, and the timing of application is also not particularly limited. When the other liquid contains a coloring, it is preferably applied by ejection through an ink-jet nozzle, preferably, additionally after application of the ink spread suppressing liquid through a nozzle.

The method of ejection through ink-jet nozzle (ink-jet recording process) is the same as that above.

In instances where the above-described application means (i) is used, at least the droplet n1 and droplet n2 of the recording liquid are applied by the ink jet recording process on the ink spread suppressing liquid which has been applied on the recording medium in advance, thereby an image is formed. In instances where the above-described application means (ii) is used, at least the droplet n1 and the droplet n2 of the recording liquid are applied by the ink jet recording process on the ink spread suppressing liquid which has been applied on the recording medium by the ink jet recording process in advance, thereby an image is formed.

In the present invention, the droplet n1 and droplet n2 has an overlap portion, which increases the number of applied droplets per unit length, and thereby allows image recording at a high resolution. In this instance, it is preferable to apply the droplet n1 and droplet n2 within 1 second after applying the ink spread suppressing liquid on a recording medium.

The overlap ratio of droplets at an overlap portion refers to a value measured at the time of 1 second after at least the droplet n1 and droplet n2 are overlappedly applied. In particular, the overlap ratio at an overlap portion at the time of 1 second after the droplet n1 and droplet n2 are applied is preferably 10% to 90%, since it is effective for image recording with higher resolution.

Furthermore, the overlap ratio is more preferably 20% to 80%, and furthermore preferably 30% to 70%.

The above-described overlap ratio is an index showing the ratio of overlapping between neighboring droplets (droplet n1, droplet n2, . . . ). When the diameter of a droplet applied on a recording medium is set at a and the portion of ½a is overlapped, the overlap ratio is 50%. In the present invention, neighboringly applied droplets can keep the applied shape without causing coalescence, and the overlap ratio is represented by 100×(2b-c)/2b [%], wherein b is the radius of the droplet measured at point in time of 1 second after application, and c is the distance interval of the neighboringly applied droplets (distance between the centers of the neighboring droplets).

The amount of application of the droplet n1 and the droplet n2 is not particularly limited, and can be selected in accordance with the sharpness of the image to be formed. Usually, the amount is preferably about 0.5 pl to 10 pl per droplet. Furthermore, application of the ink spread suppressing liquid is not particularly limited as long as it is applied to the same area with or a wider area than the image area formed by the droplet n1 and droplet n2 of the recording liquid.

Concerning the proportion of the applied amount of the ink spread suppressing liquid per one droplet of the droplet n1 and the droplet n2 of the recording liquid, when the amount of the droplet n1 or droplet n2 is 1, the amount of application of the ink spread suppressing liquid (mass ratio) is preferably in the range of 0.05 to 5, more preferably in the range of 0.07 to 1, and most preferably in the range of 0.1 to 1.

At least one of the droplet n1 and droplet n2 of the recording liquid is preferably applied at a droplet size of 0.1 pl (pico liter; hereinafter the same shall apply) to 100 pl (preferably from an ink jet nozzle). When the droplet size is within the above-described range, an image with high sharpness can be advantageously formed at a high density. Furthermore, the size is more preferably 0.5 pl to 50 pl.

A time interval between the finishing point of the application of the ink spread suppressing liquid and the starting point of the application of droplet n1 of the recording liquid is in the range of 5 μ seconds to 400 m seconds. When the time interval is within the above-described range, the effect of the present invention is advantageously achieved. The time interval is more preferably 10 μ seconds to 300 m seconds, and most preferably 20 μ seconds to 200 μ seconds.

In the ink-jet recording method according to the invention, the forming of the image is preferably a single-pass process. The single-pass process is an image forming method of forming an image on the entire surface of the recording medium by using a full-line head covering the entire area of the recording medium and moving the full-line head relative to the recording medium only once. Examples of such a single-pass process are described in JP-A Nos. 2005-96443 and 2005-280346.

Hardening Step

In the method according to the invention, the formed image is hardened by application of energy as described above after applying an ink spread suppressing liquid and then recording liquids (for example, droplets $n_1$ and $n_2$) from the viewpoint that it is possible to obtain better fixing efficiency. In addition, the energy is preferable applied only once after the forming of the image, for reduction in energy consumption and improvement in printing speed.

The application of energy promotes the curing reaction due to polymerization or crosslinking of the polymerizable compound contained in the liquids; thereby a more solid image is more effectively formed. For example, in a system containing a polymerization initiator, the application of active energy such as activation light and heat promotes the generation of active species due to the decomposition of the polymerization initiator, and the increased active species and temperature promote the curing reaction of the polymerizable compound due to polymerization or crosslinking caused by the active species.

The application of energy may be appropriately carried out by activation light irradiation or heating.

As the above-described activation light, for example, ultraviolet light, visible light, as well as γ ray, γ ray, X ray, and electron beam or the like may be used. Among them, ultraviolet light and visible light are preferable, and ultraviolet light is most preferable from the viewpoints of cost and safety.

While the amount of energy necessary for curing reaction is different depending on the kind and content of the polymerization initiator, it is usually about 1 to 500 mJ/cm$^2$.

When energy is applied by heating, the heating treatment is preferably carried out for 0.1 to 1 second under conditions that the surface temperature of the recording medium is in the range of 40 to 80° C.

The heating treatment may be carried out by a non-contact type heating method. Preferable examples of the heating method include a heating method of passing through a heating furnace such as an oven, and a heating method by whole surface exposure with ultraviolet light to visible light to infrared light or the like. Examples of the light source suitable for exposure as a heating method include a metal halide lamp, a xenon lamp, a tungsten lamp, a carbon arc lamp, and a mercury lamp.

Recording Medium

The recording medium may be used without any limitation; however, an impermeable or slow-permeable recording medium is preferably used from the viewpoint of remarkably achieving the effects of the invention.

Examples of the impermeable recording medium include synthetic resins, rubber, resin coated paper, glass, metal, ceramic, and wood. Furthermore, these materials may be used in combination of two or more as composite substrates for the purpose of adding functions.

As the above-described synthetic resin, any synthesis resins may be used. Examples thereof include polyester such as polyethylene terephthalate, and polybutadiene terephthalate, polyolefin such as polyvinyl chloride, polystyrene, polyethylene, polyurethane, and polypropylene, acrylic resin, polycarbonate, acrylonitrile-butadiene-styrene copolymer, diacetate, triacetate, polyimide, cellophane, and celluloid. The thickness and shape of these synthesis resins are not particularly limited, and the shape may be either film, card, or block form. Furthermore, the resins may be either transparent or opaque.

The above-described synthesis resin is preferably used in film form which is suitable for so-called soft packaging, and examples thereof include various non-absorbing plastics and films thereof. Examples of the plastic film include a PET film, an OPS film, an OPP film, a PNy film, a PVC film, a PE film, and a TAC film. Other examples of the plastics include polycarbonate, acrylic resin, ABS, polyacetal, PVA, and rubbers.

Examples of the above-described resin coated paper include a transparent polyester film, an opaque polyester film, an opaque polyolefin resin film, and a paper support laminated with a polyolefin resin on both sides. Among them, a paper support laminated with a polyolefin resin on both side surfaces is most preferable.

The above-described metal is not particularly limited, and preferable examples thereof include aluminum, iron, gold, silver, copper, nickel, titanium, chromium, molybdenum, silicon, lead, zinc, stainless steel, and composite materials thereof.

Furthermore, read-only optical disks such as CD-ROM and DVD-ROM, write-once optical disks such as CD-R and DVD-R, and re-writable optical disks can be used, and an ink receiving layer and a brightening layer may be added to the label surface.

Hereinafter, favorable embodiments of the invention will be described, but the invention is not limited thereto.

<1> An ink-jet recording ink set, comprising at least one recording liquid containing a colorant and a polymerizable compound and an ink spread suppressing liquid containing at least one surfactant and substantially no colorant, wherein all of the following conditions (A), (B) and (C) are satisfied:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0) - \gamma^s(\text{saturated}) > 1$ mN/m; and (C) the surface tension of the ink spread suppressing liquid satisfies the following relationship:

$\gamma^s < (\gamma^s(0) + \gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

<2> The ink-jet recording ink set of <1>, wherein the surface tension of the ink spread suppressing liquid is lower than that of the recording liquid containing a colorant higher in visual sensitivity among the recording liquid contained in the ink-jet recording ink set.

<3> The ink-jet recording ink set of <1>, wherein the surface tension of the ink spread suppressing liquid is lower than that of any recording liquid contained in the ink-jet recording ink set.

<4> The ink-jet recording ink set of <1>, wherein the concentration Ms, in the ink spread suppressing liquid, of at least one surfactant among the surfactants contained in the ink spread suppressing liquid is larger than the concentration Mk, in the recording liquid, of said surfactant.

<5> The ink-jet recording ink set of <1>, wherein at least one of the recording liquid and the ink spread suppressing liquid contains a polymerization initiator.

<6> The ink-jet recording ink set of <1>, wherein the polymerizable compound is a radical-polymerization compound.

<7> The ink-jet recording ink set of <1>, wherein the polymerizable compound is insoluble in water.

<8> An ink-jet recording method using an ink-jet recording ink set comprising at least one recording liquid containing a colorant and a polymerizable compound and an ink spread suppressing liquid containing at least one surfactant and substantially no colorant, the method comprising forming an image on a recording medium by applying the recording liquid and the ink spread suppressing liquid; and hardening the formed image by applying energy thereto, wherein all of the following conditions (A), (B) and (C) are satisfied:

(A) the surface tension of the ink spread suppressing liquid is smaller than that of at least one recording liquid contained in the ink-jet recording ink set;

(B) at least one of the surfactants contained in the ink spread suppressing liquid satisfies the following relationship:

$\gamma^s(0) - \gamma^s(\text{saturated}) > 1$ mN/m; and (C) the surface tension of the ink spread suppressing liquid satisfies the following relationship:

$\gamma^s < (\gamma^s(0) + \gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

<9> The ink-jet recording method of <8>, wherein the ink spread suppressing liquid is applied on an area corresponding to the image to be formed on the recording medium with droplets of the recording liquid or an area wider than the area corresponding to the image, before application of the droplets of the recording liquid.

<10> The ink-jet recording method of <8>, wherein the forming of the image on the recording medium by applying the recording liquid and the ink spread suppressing liquid is a single-pass process.

<11> The ink-jet recording method of <8>, wherein the energy is applied by photoirradiation or heating.

<12> The ink-jet recording method of <8>, wherein the energy is applied only once after the forming of the image.

<13> The ink-jet recording method of <8>, wherein the surface tension of the ink spread suppressing liquid is lower than that of the recording liquid containing a colorant higher in visual sensitivity among the recording liquid contained in the ink-jet recording ink set.

<14> The ink-jet recording method of <8>, wherein the surface tension of the ink spread suppressing liquid is lower than that of any recording liquid contained in the ink-jet recording ink set.

<15> The ink-jet recording method of <8>, wherein the concentration Ms, in the ink spread suppressing liquid, of at least one surfactant among the surfactants contained in the ink spread suppressing liquid is larger than the concentration Mk, in the recording liquid, of said surfactant.

<16> The ink-jet recording method of <8>, wherein at least one of the recording liquid and the ink spread suppressing liquid contains a polymerization initiator.

<17> The ink-jet recording method of <8>, wherein the polymerizable compound is a radical-polymerization compound.

<18> The ink-jet recording method of <8>, wherein the polymerizable compound is insoluble in water.

EXAMPLES

Hereinafter, the present invention will be described in more detail with reference to Examples, but it should be understood that the invention is not limited to the following Examples.

Example 1

Evaluation of Printed Character Quality

[Preparation of Colorant Dispersions (Cyan Pigment Dispersions 1 and 2)]

16 g of PB15:3 (IRGALITE BLUE GLO, manufactured by Ciba Specialty Chemicals), 48 g of 1,6-hexanediol diacrylate (manufactured by Daicel SciTech), and 16 g of BYK-168 (manufactured by BYK-Chemie) were mixed and agitated by stirrer for 1 hour. The mixture after agitating was dispersed in an Eiger mill, to give a pigment dispersion 1. Dispersion was performed by using zirconia beads having a diameter of 0.65 mm at a filling factor of 70% under the condition of a peripheral speed of 9 m/s and a period of 1 hour. Processing in the steps above gave a cyan pigment dispersion 1.

Similarly, 16 g of PB15:3 (IRGALITE BLUE GLO, manufactured by Ciba Specialty Chemicals), 48 g of diethyl phthalate (manufactured by Wako Pure Chemical Industries), and 16 g of BYK-168 (manufactured by BYK-Chemie) were mixed and agitated by stirrer for 1 hour. The mixture after agitation was dispersed in an Eiger mill, to give a pigment dispersion 2. Dispersion was performed by using zirconia beads having a diameter of 0.65 mm at a filling factor of 70% under the condition of a peripheral speed of 9 m/s and a period of 1 hour. Processing in the steps above gave a cyan pigment dispersion 2.

[Preparation of Recording Liquid and Ink Spread Suppressing Liquid]

The components shown in the following Table 1 were mixed, agitated and dissolved at the rates shown in Table 1, respectively to give recording liquids A to F. The surface tension of the recording liquids A to F, as determined according to Wilhelmy method (surface tension balance CBVP-Z, manufactured by Kyowa Interface Science Co., Ltd.) at 20° C. and 60% RH, is shown in Table 1.

TABLE 1

| | | | | | | | | | |
|---|---|---|---|---|---|---|---|---|---|
| <Composition and surface tension of recording liquid> | | | | | | | | | |
| | | | High-boiling point | | | | Surfactant | | |
| Recording liquid | Monomer 1 (g) | Monomer 2 (g) | organic solvent 1 (g) | Pigment dispersion 1 (g) | Pigment dispersion 2 (g) | Addition amount (g) | Concentration % by mass | Kind | Surface tension $\gamma k$ (mN/m) |
| A | 0.15 | 9.85 | — | 10 | — | — | 0 | None | 34.6 |
| B | 0.15 | 9.85 | — | 10 | — | 0.08 | 0.4 | Surfactant 1 | 32.4 |
| C | 0.15 | 9.85 | — | 10 | — | 0.2 | 0.99 | Surfactant 1 | 31.3 |
| D | 0.15 | 9.85 | — | 10 | — | 0.1 | 0.5 | Surfactant 2 | 26.1 |
| E | 0.15 | 9.85 | — | 10 | — | 0.2 | 0.99 | Surfactant 2 | 24.5 |
| F | — | — | 10 | — | 10 | — | 0 | None | 36.4 |

Then, the components shown in the following Table 2 were mixed, agitated and dissolved at the rates shown in Table 2, respectively to give ink spread suppressing liquids 1 to 22. The surface tension of the ink spread suppressing liquids 1 to 22, as determined similarly according to the Wilhelmy method, is shown in Table 2.

$\gamma^s$(saturated): saturated surface tension of a liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated

TABLE 2

<Composition and surface tension of ink spread suppressing liquid>

| Ink spread suppressing liquid | Solvent Addition amount (g) | Kind | Initiator 1 | Surfactant Addition amount (g) | Concentration (% by mass) | Kind | Surface tension γs | γs(0) | γs(saturated) | γs(saturated)$^{max}$ | (γs(0) + γs(saturated)$^{max}$)/2 |
|---|---|---|---|---|---|---|---|---|---|---|---|
| 1 | 8.8 | solvent 1 | 1.2 | 0 | 0 | None | 36.7 | 36.7 | — | — | — |
| 2 | 8.8 | solvent 1 | 1.2 | 0.17 | 1.7 | Surfactant 2 | 21.2 | 36.7 | 20.2 | 20.2 | 28.45 |
| 3 | 8.8 | solvent 1 | 1.2 | 0.034 | 0.34 | Surfactant 2 | 25 | 36.7 | 20.2 | 20.2 | 28.45 |
| 4 | 8.8 | solvent 1 | 1.2 | 0.017 | 0.17 | Surfactant 2 | 27.6 | 36.7 | 20.2 | 20.2 | 28.45 |
| 5 | 8.8 | solvent 1 | 1.2 | 0.008 | 0.08 | Surfactant 2 | 29.7 | 36.7 | 20.2 | 20.2 | 28.45 |
| 6 | 8.8 | solvent 1 | 1.2 | 0.005 | 0.05 | Surfactant 2 | 31.7 | 36.7 | 20.2 | 20.2 | 28.45 |
| 7 | 8.8 | solvent 1 | 1.2 | 0.002 | 0.02 | Surfactant 2 | 34.4 | 36.7 | 20.2 | 20.2 | 28.45 |
| 8 | 8.8 | solvent 1 | 1.2 | 0.2 | 2 | Surfactant 1 | 30.7 | 36.7 | 30.5 | 30.5 | 33.6 |
| 9 | 8.8 | solvent 1 | 1.2 | 0.08 | 0.8 | Surfactant 1 | 31.9 | 36.7 | 30.5 | 30.5 | 33.6 |
| 10 | 8.8 | solvent 1 | 1.2 | 0.04 | 0.4 | Surfactant 1 | 33.4 | 36.7 | 30.5 | 30.5 | 33.6 |
| 11 | 8.8 | solvent 1 | 1.2 | 0.02 | 0.2 | Surfactant 1 | 35.7 | 36.7 | 30.5 | 30.5 | 33.6 |
| 12 | 8.8 | solvent 1 | 1.2 | 0.2 | 2 | Surfactant 3 | 21.5 | 36.7 | 21.4 | 21.4 | 29.05 |
| 13 | 8.8 | solvent 1 | 1.2 | 0.05 | 0.5 | Surfactant 3 | 28.6 | 36.7 | 21.4 | 21.4 | 29.05 |
| 14 | 8.8 | solvent 1 | 1.2 | 0.01 | 0.1 | Surfactant 3 | 30.8 | 36.7 | 21.4 | 21.4 | 29.05 |
| 15 | 8.8 | solvent 1 | 1.2 | 0.005 | 0.05 | Surfactant 3 | 35.3 | 36.7 | 21.4 | 21.4 | 29.05 |
| 16 | 8.8 | solvent 1 | 1.2 | 0.001 | 0.01 | Surfactant 3 | 36.4 | 36.7 | 21.4 | 21.4 | 29.05 |
| 17 | 8.8 | Monomer 2 | 1.2 | 0 | 0 | None | 34.6 | 34.6 | — | — | — |
| 18 | 8.8 | Monomer 2 | 1.2 | 0.2 | 2 | Surfactant 2 | 23.6 | 34.6 | 23.5 | 23.5 | 29.05 |
| 19 | 8.8 | Monomer 2 | 1.2 | 0.05 | 0.5 | Surfactant 2 | 26.4 | 34.6 | 23.5 | 23.5 | 29.05 |
| 20 | 8.8 | Monomer 2 | 1.2 | 0.01 | 0.1 | Surfactant 2 | 30.1 | 34.6 | 23.5 | 23.5 | 29.05 |
| 21 | 8.8 | Monomer 2 | 1.2 | 0.005 | 0.05 | Surfactant 2 | 31.8 | 34.6 | 23.5 | 23.5 | 29.05 |
| 22 | 8.8 | Monomer 2 | 1.2 | 0.001 | 0.01 | Surfactant 2 | 33.9 | 34.6 | 23.5 | 23.5 | 29.05 |
| 23 | 8.8 | solvent 2 | 1.2 | 0.2 | 1.7 | Surfactant 1 | 31.1 | 31.8 | 31 | 31 | 31.4 |
| 24 | 8.8 | solvent 3 | 1.2 | 0.2 | 1.7 | Surfactant 1 | 31 | 33.2 | 31 | 31 | 32.1 |
| 25 | 8.8 | Monomer 3 | 1.2 | 0.2 | 1.7 | Surfactant 1 | 30.1 | 28.7 | 30.3 | 30.3 | 29.5 |
| 26 | 8.8 | Monomer 4 | 1.2 | 0.2 | 1.7 | Surfactant 1 | 31.8 | 33.1 | 31.7 | 31.7 | 32.4 |

<Notes for Tables 1 and 2>

Surfactant 1: sodium di-2-ethylhexylsulfoscuccinate

Surfactant 2: Megaface F475 (manufactured by Dainippon Ink and Chemicals, Inc.)

Surfactant 3: Zonyl FSN-100 (manufactured by DuPont)

Initiator 1: TPO-L (exemplary compound, polymerization initiator-1)

Solvent 1: diethyl phthalate (manufactured by Wako Pure Chemical Industries)

Solvent 2: dibutyl sebacate (manufactured by Wako Pure Chemical Industries)

Solvent 3: dibutyl phthalate (manufactured by Wako Pure Chemical Industries)

Monomer 1: DPCA60 (manufactured by Nippon Kayaku)

Monomer 2: 1,6-hexanediol diacrylate (manufactured by Daicel SciTech)

Monomer 3: isobornyl acrylate (manufactured by Daicel SciTech)

Monomer 4: dipropylene glycol diacrylate (manufactured by Daicel SciTech)

$\gamma^s$: surface tension of the ink spread suppressing liquid $\gamma^s(0)$: surface tension of a liquid obtained by eliminating all surfactants from the ink spread suppressing liquid

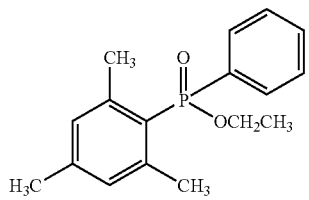

Polymerization initiator-1

[Evaluation of Printing (Character)]

Characters (in font size: 10, 20, and 30) were printed on a recording medium by using each of the recording liquids prepared (recording liquids A to E) and each of the ink spread suppressing liquids (ink spread suppressing liquids 1 to 26) in an ink-jet printer A (test machine equipped with a head (CA3) manufactured by Toshiba TEC, image definition: 300×300 dpi (two heads per color), printing range: 53.583 mm, nozzle number: 636/2 heads, printing speed: 0.41 m/sec, and printing mode: single pass). The droplet of the recording liquid was applied on the droplet of the ink spread suppressing liquid so that the droplets overlap each other on the recording medium.

In addition, an image was formed only with the recording liquid (A to D) (ink set 51 to 54) and compared with the image formed with both the recording liquid and the ink spread suppressing liquid (ink set 1 to 50).

The recording media used were a polyethylene terephthalate sheet (PET, thickness: 60 μm), a polypropylene sheet (PP, thickness: 60 μm), and a polyvinyl chloride plate (PVC, thickness: 1 mm).

Approximately five seconds after printing, the image was irradiated with UV light at ultraviolet ray intensity of 500 mJ/cm$^2$ by using a metal halide lamp emitting a light at a wavelength of 365 nm. The quality of the printed characters was evaluated by optical-microscope observation and visual observation according to the following criteria. Results are summarized in Tables 3 and 4.

<Evaluation Criteria>

A: Distinct characters printed without fusion between recording liquid droplets due to interference between ink droplets expansion of the recording-solution dot.

B: Characters favorable in quality printed without fusion between recording liquid droplets due to interference between ink droplets but with slight expansion of the recording-solution dot.

C: Characters partially whitened observed with expansion of recording liquid dot, although there was no fusion between recording liquid droplets due to interference between ink droplets.

D: Recording-liquid dot significantly expanded and characters even in larger font size unrecognizable, although there was no fusion between recording liquid droplets due to interference between ink droplets.

E: Characters in larger font size unrecognizable and there was significant fusion of the recording liquid droplets due to interference between ink droplets.

The criteria A and B are at the practical level.

TABLE 3

<Results of evaluation of character quality>

| | Ink set | | Surface tension (mN/m) | | Quality of the characters formed on recording medium | | | Satisfying conditions A, B, and C? Yes: (y), no: (n), and not relevant (—)ABC | | | |
|---|---|---|---|---|---|---|---|---|---|---|---|
| No. | Recording liquid | Ink spread suppressing liquid | Recording liquid γk | Ink spread suppressing liquid γs | PET | PP | PVC | Condition A | Condition B | Condition C | Remarks |
| 1 | A | 1 | 34.5 | 36.7 | D | D | D | n | — | n | Comp. |
| 2 | | 2 | | 21.2 | A | A | A | y | y | y | Inv. |
| 3 | | 3 | | 25 | B | B | B | y | y | y | Inv. |
| 4 | | 4 | | 27.6 | B | B | B | y | y | y | Inv. |
| 5 | | 5 | | 29.7 | C | C | C | y | y | n | Comp. |
| 6 | | 6 | | 31.7 | C | C | C | y | y | n | Comp. |
| 7 | | 7 | | 34.4 | C | C | C | y | y | n | Comp. |
| 8 | | 8 | | 30.7 | B | B | B | y | y | y | Inv. |
| 9 | | 9 | | 31.9 | B | B | B | y | y | y | Inv. |
| 10 | | 10 | | 33.4 | B | B | B | y | y | y | Inv. |
| 11 | | 11 | | 35.7 | D | D | D | n | y | n | Comp. |
| 12 | | 12 | | 21.5 | A | A | A | y | y | y | Inv. |
| 13 | | 13 | | 28.6 | A | A | A | y | y | y | Inv. |
| 14 | | 14 | | 30.8 | D | D | D | n | y | n | Comp. |
| 15 | | 15 | | 35.3 | D | D | D | n | y | n | Comp. |
| 16 | | 16 | | 36.4 | D | D | D | n | y | n | Comp. |
| 17 | | 23 | | 31.1 | C | C | C | y | n | y | Comp. |
| 18 | | 24 | | 31 | A | A | A | y | y | y | Inv. |
| 19 | | 25 | | 30.1 | C | C | C | y | n | n | Comp. |
| 20 | | 26 | | 31.8 | A | A | A | y | y | y | Inv. |
| 21 | B | 1 | 32.4 | 36.7 | D | D | D | n | — | n | Comp. |
| 22 | | 2 | | 21.2 | A | A | A | y | y | y | Inv. |
| 23 | | 3 | | 25 | B | B | B | y | y | y | Inv. |
| 24 | | 4 | | 27.6 | B | B | B | y | y | y | Inv. |
| 25 | | 5 | | 29.7 | C | C | C | y | y | n | Comp. |
| 26 | | 8 | | 30.7 | B | B | B | y | y | y | Inv. |
| 27 | | 9 | | 31.9 | B | B | B | y | y | y | Inv. |
| 28 | | 10 | | 33.4 | D | D | D | n | y | y | Comp. |
| 29 | | 11 | | 35.7 | D | D | D | n | y | n | Comp. |
| 30 | | 17 | | 34.6 | D | D | D | n | — | n | Comp. |
| 31 | | 18 | | 23.6 | A | A | A | y | y | y | Inv. |
| 32 | | 19 | | 26.4 | A | A | A | y | y | y | Inv. |
| 33 | | 20 | | 30.1 | C | C | C | y | y | n | Comp. |
| 34 | | 21 | | 31.8 | C | C | C | y | y | n | Comp. |
| 35 | | 22 | | 33.9 | D | D | D | n | y | n | Comp. |
| 36 | C | 8 | 31.3 | 30.7 | B | B | B | y | y | y | Inv. |
| 37 | | 9 | | 31.9 | D | D | D | n | y | y | Comp. |
| 38 | | 10 | | 33.4 | D | D | D | n | y | y | Comp. |
| 39 | | 11 | | 35.7 | D | D | D | n | y | n | Comp. |

TABLE 4

| No. | Ink set Recording liquid | Ink set Ink spread suppressing liquid | Surface tension (mN/m) Recording liquid $\gamma k$ | Surface tension (mN/m) Ink spread suppressing liquid $\gamma s$ | Quality of the characters formed on recording medium PET | PP | PVC | Satisfying conditions A, B, and C? Yes: (y), no: (n), and not relevant (—)ABC Condition A | Condition B | Condition C | Remarks |
|---|---|---|---|---|---|---|---|---|---|---|---|
| 40 | D | 18 | 26.1 | 23.6 | A | A | A | y | y | y | Inv. |
| 41 |   | 19 |   | 26.4 | D | D | D | n | y | y | Comp |
| 42 |   | 22 |   | 33.9 | D | D | D | n | y | n | Comp. |
| 43 |   | 2 |   | 21.2 | A | A | A | y | y | y | Inv. |
| 44 |   | 3 |   | 25 | B | B | B | y | y | y | Inv. |
| 45 |   | 4 |   | 27.6 | D | D | D | n | y | y | Comp. |
| 46 |   | 5 |   | 29.7 | D | D | D | n | y | n | Comp. |
| 47 | E | 2 | 24.5 | 21.2 | A | A | A | y | y | y | Inv. |
| 48 |   | 3 |   | 25 | D | D | D | n | y | y | Comp. |
| 49 |   | 4 |   | 27.6 | D | D | D | n | y | y | Comp. |
| 50 |   | 5 |   | 29.7 | D | D | D | n | y | n | Comp. |
| 51 | A | None | 34.5 | — | E | E | E | — | — | — | Comp. |
| 52 | B | None | 32.4 | — | E | E | E | — | — | — | Comp. |
| 53 | C | None | 31.3 | — | E | E | E | — | — | — | Comp. |
| 54 | D | None | 26.1 | — | E | E | E | — | — | — | Comp. |

<Notes for Tables 3 and 4>
Condition (A): y if $\gamma^k > \gamma^s$; and n if $\gamma^k \leq \gamma^s$.
Condition (B): y if $\gamma^s(0) - \gamma^s(\text{saturated}) > 1$ mN/m; and n if $\gamma^s(0) - \gamma^s(\text{saturated}) \leq 1$ mN/m.
Condition (C): y if $\gamma^s < (\gamma^s(0) + \gamma^s(\text{saturated})^{max})/2$; and n if $\gamma^s > (\gamma^s(0) + \gamma^s(\text{saturated})^{max})/2$.
Inv. and Comp. in remarks represents the invention and the comparative example, respectively.

<Notes for Tables 3 and 4>

Condition (A): y if $\gamma^k > \gamma^s$; and n if $\gamma^k \leq \gamma^s$.

Condition (B): y if $\gamma^s(0) - \gamma^s(\text{saturated}) > 1$ mN/m; and n if $\gamma^s(0) - \gamma^s(\text{saturated}) \leq 1$ mN/m.

Condition (C): y if $\gamma^s < (\gamma^s(0) + \gamma^s(\text{saturated})^{max})/2$; and n if $\gamma^s > (\gamma^s(0) - \gamma^s(\text{saturated}))^{max}/2$.

Inv. and Comp. in remarks represents the invention and the comparative example, respectively.

Comparison of the images formed with the ink sets 1 to 50 and those formed with the ink sets 51 to 54 in Tables 3 and 4 revealed that it was possible to prevent the deterioration in image quality due to interference between recording liquid droplets on a variety of recording media, by printing an image in such a manner that the droplet of the recording liquid was applied on the droplet of the ink spread suppressing liquid so that the droplets overlap each other on the recording medium.

However, when the droplet of the recording liquid was applied on the droplet of the ink spread suppressing liquid so that the droplets overlap each other on the recording medium, the image quality occasionally deteriorated because of expansion of the recording-liquid dot even if it was possible to prevent the interference between recording liquid droplets (e.g., ink sets 1 and 11).

The results showed that, when the droplet of the recording liquid was applied on the droplet of the ink spread suppressing liquid so that the droplets overlap each other on the recording medium, it was necessary to make all of the conditions (A), (B), and (C) be satisfied, in order to suppress the widening of the recording liquid dot, and that it was possible to print high-definition characters in such a case.

Example 2

Evaluation of Image Fixing Efficiency

A cross-patterned image was formed on a recording medium by using the recording liquid prepared in Example 1 (recording liquid A or F) and the ink spread suppressing liquid (ink spread suppressing liquid 2, 8, or 12) in an ink-jet printer A (test machine equipped with a head (CA3) manufactured by Toshiba TEC, image definition: 300×300 dpi (two heads per color), printing range: 53.583 mm, nozzle number: 636/2 head, printing speed: 0.41 m/sec, and printing mode: single pass). The droplet of the recording liquid was applied on the droplet of the ink spread suppressing liquid so that the droplets overlap each other on the recording medium, and the image was formed by irradiating the droplets with UV light at an ultraviolet ray intensity of 500 mJ/cm², approximately 5 seconds after printing by using a metal halide lamp emitting a light at a wavelength of 365 nm.

In addition for comparison, a cross-patterned image was formed on a recording medium by using each of commercially available aqueous inks 1 to 3 (BCI-7C cyan dye ink (manufactured by Canon), ICC32 cyan dye ink (manufactured by Epson), and ICC33 cyan pigment ink (manufactured by Epson)) replacing the recording liquid A but without use of the ink spread suppressing liquid in an ink-jet printer A (test machine equipped with a head (CA3) manufactured by Toshiba TEC, image definition: 300×300 dpi (two heads per color), printing range: 53.583 mm, nozzle number: 636/2 head, printing speed: 0.41 m/sec, and printing mode: single pass). The recording medium used was a polyethylene terephthalate sheet having a thickness of 60 μm.

The image on the sample carrying the formed image 30 minutes after printing was abraded with an eraser 10 times reciprocally, and the change was observed and evaluated according to the following criteria. Results are summarized in Table 5.

<Evaluation Criteria>
A: No deterioration in density
B: Slight deterioration in density
C: Significant deterioration in density

TABLE 5

<Results of evaluation of fixing efficiency>

| No | Ink set Recording liquid | Ink spread suppressing liquid | Evaluation result of fixing efficiency | Remarks |
|---|---|---|---|---|
| 2 | Recording liquid A | 2 | A | The invention |
| 8 | | 8 | A | The invention |
| 12 | | 12 | A | The invention |
| 55 | Recording liquid F | 2 | C | Comparative example |
| 56 | | 8 | C | Comparative example |
| 57 | | 12 | C | Comparative example |
| 58 | Commercial aqueous ink 1 | None | C | Comparative example |
| 59 | Commercial aqueous ink 2 | None | C | Comparative example |
| 60 | Commercial aqueous ink 3 | None | C | Comparative example |

As apparent from the results in Table 5, it was possible to form an image superior in fixing efficiency on a impermeable recording medium by using an ink set (2, 8, or 12) consisting of a recording liquid containing a colorant and a polymerizable compound and a ink spread suppressing liquid containing no colorant and applying the droplet of the recording liquid on the droplet of the ink spread suppressing liquid, so that the droplets overlap each other on the recording medium, and polymerizing and hardening the droplets.

What is claimed is:

1. An ink-jet recording ink set, comprising at least one recording liquid containing a colorant and a polymerizable compound and an ink spread suppressing liquid containing at least one surfactant and substantially no colorant, wherein all of the following conditions (A), (B) and (C) are satisfied:
   (A) the surface tension of the ink spread suppressing liquid is smaller than that of at least one recording liquid contained in the ink-jet recording ink set;
   (B) at least one of the surfactants contained in the ink spread suppressing liquid satisfies the following relationship:

$\gamma^s(0)-\gamma^s(\text{saturated}) > 1$ mN/m; and (C) the surface tension of the ink spread suppressing liquid satisfies the following relationship:

$\gamma^s < (\gamma^s(0)+\gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

2. The ink-jet recording ink set of claim 1, wherein the surface tension of the ink spread suppressing liquid is lower than that of the recording liquid containing a colorant higher in visual sensitivity among the recording liquid contained in the ink-jet recording ink set.

3. The ink-jet recording ink set of claim 1, wherein the surface tension of the ink spread suppressing liquid is lower than that of any recording liquid contained in the ink-jet recording ink set.

4. The ink-jet recording ink set of claim 1, wherein the concentration Ms, in the ink spread suppressing liquid, of at least one surfactant among the surfactants contained in the ink spread suppressing liquid is larger than the concentration Mk, in the recording liquid, of said surfactant.

5. The ink-jet recording ink set of claim 1, wherein at least one of the recording liquid and the ink spread suppressing liquid contains a polymerization initiator.

6. The ink-jet recording ink set of claim 1, wherein the polymerizable compound is a radical-polymerization compound.

7. The ink-jet recording ink set of claim 1, wherein the polymerizable compound is insoluble in water.

8. An ink-jet recording method using an ink-jet recording ink set comprising at least one recording liquid containing a colorant and a polymerizable compound and an ink spread suppressing liquid containing at least one surfactant and substantially no colorant, the method comprising
   forming an image on a recording medium by applying the recording liquid and the ink spread suppressing liquid; and
   hardening the formed image by applying energy thereto,
   wherein all of the following conditions (A), (B) and (C) are satisfied:
   (A) the surface tension of the ink spread suppressing liquid is smaller than that of at least one recording liquid contained in the ink-jet recording ink set;
   (B) at least one of the surfactants contained in the ink spread suppressing liquid satisfies the following relationship:

$\gamma^s(0)-\gamma^s(\text{saturated}) > 1$ mN/m; and (C) the surface tension of the ink spread suppressing liquid satisfies the following relationship:

$\gamma^s < (\gamma^s(0)+\gamma^s(\text{saturated})^{max})/2$, wherein, $\gamma^s$ represents the surface tension of the ink spread suppressing liquid; $\gamma^s(0)$ represents the surface tension of a liquid obtained by eliminating all surfactants from the ink spread suppressing liquid; $\gamma^s(\text{saturated})$ represents the saturated surface tension of the liquid obtained by eliminating all surfactants from the ink spread suppressing liquid when one of the surfactants contained in the ink spread suppressing liquid is added to the liquid obtained by eliminating all surfactants from the ink spread suppressing liquid until the surface tension thereof becomes saturated; and $\gamma^s(\text{saturated})^{max}$ represents the maximum value of the $\gamma^s(\text{saturated})$ values of all surfactants satisfying the condition (B) contained in the ink spread suppressing liquid.

9. The ink-jet recording method of claim 8, wherein the ink spread suppressing liquid is applied on an area corresponding to the image to be formed on the recording medium with droplets of the recording liquid or an area wider than the area corresponding to the image, before application of the droplets of the recording liquid.

10. The ink-jet recording method of claim 8, wherein the forming of the image on the recording medium by applying the recording liquid and the ink spread suppressing liquid is a single-pass process.

11. The ink-jet recording method of claim 8, wherein the energy is applied by photoirradiation or heating.

12. The ink-jet recording method of claim 8, wherein the energy is applied only once after the forming of the image.

13. The ink-jet recording method of claim 8, wherein the surface tension of the ink spread suppressing liquid is lower than that of the recording liquid containing a colorant higher in visual sensitivity among the recording liquid contained in the ink-jet recording ink set.

14. The ink-jet recording method of claim 8, wherein the surface tension of the ink spread suppressing liquid is lower than that of any recording liquid contained in the ink-jet recording ink set.

15. The ink-jet recording method of claim 8, wherein the concentration Ms, in the ink spread suppressing liquid, of at least one surfactant among the surfactants contained in the ink spread suppressing liquid is larger than the concentration Mk, in the recording liquid, of said surfactant.

16. The ink-jet recording method of claim 8, wherein at least one of the recording liquid and the ink spread suppressing liquid contains a polymerization initiator.

17. The ink-jet recording method of claim 8, wherein the polymerizable compound is a radical-polymerization compound.

18. The ink-jet recording method of claim 8, wherein the polymerizable compound is insoluble in water.

* * * * *